(12) United States Patent
Ito et al.

(10) Patent No.: US 9,817,157 B2
(45) Date of Patent: Nov. 14, 2017

(54) LENS ARRAY SUBSTRATE, ELECTRO-OPTICAL APPARATUS AND ELECTRONIC EQUIPMENT

(71) Applicant: Seiko Epson Corporation, Tokyo (JP)

(72) Inventors: Satoshi Ito, Eniwa (JP); Masashi Nakagawa, Chitose (JP); Hiroyuki Oikawa, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 196 days.

(21) Appl. No.: 14/794,729

(22) Filed: Jul. 8, 2015

(65) Prior Publication Data

US 2016/0018568 A1 Jan. 21, 2016

(30) Foreign Application Priority Data

Jul. 16, 2014 (JP) .................. 2014-145665

(51) Int. Cl.
*G02F 1/1335* (2006.01)
*G02B 3/00* (2006.01)

(52) U.S. Cl.
CPC ......... *G02B 3/0068* (2013.01); *G02B 3/0056* (2013.01); *G02F 1/133502* (2013.01); *G02F 1/133512* (2013.01); *G02F 1/133526* (2013.01)

(58) Field of Classification Search
None
See application file for complete search history.

(56) References Cited

U.S. PATENT DOCUMENTS

| 5,680,186 A | * | 10/1997 | Watanabe | ......... G02F 1/133526 349/122 |
| 2015/0331280 A1 | * | 11/2015 | Wakabayashi | .... G02F 1/133512 349/57 |

FOREIGN PATENT DOCUMENTS

JP 2013-057781 A 3/2013

* cited by examiner

*Primary Examiner* — Richard Kim
(74) *Attorney, Agent, or Firm* — ALG Intellectual Property, LLC

(57) ABSTRACT

When it comes to configuring the lens array substrate on which a multistage lens array is formed, a first concavity which is formed of the concave surface is formed on a first surface which is formed of a substrate surface of one of several translucent substrates. In addition, on the substrate surface of one of the translucent substrates, a first lens layer, a first translucent layer, a second lens layer, a second translucent layer, a translucent protective layer, and a common electrode are stacked in order. The first translucent layer has the same refractive index as that of the first lens layer and the second lens layer. In addition, a refractive index of the protective layer is within a range between the refractive index of the second translucent layer and the refractive index of the common electrode.

18 Claims, 11 Drawing Sheets

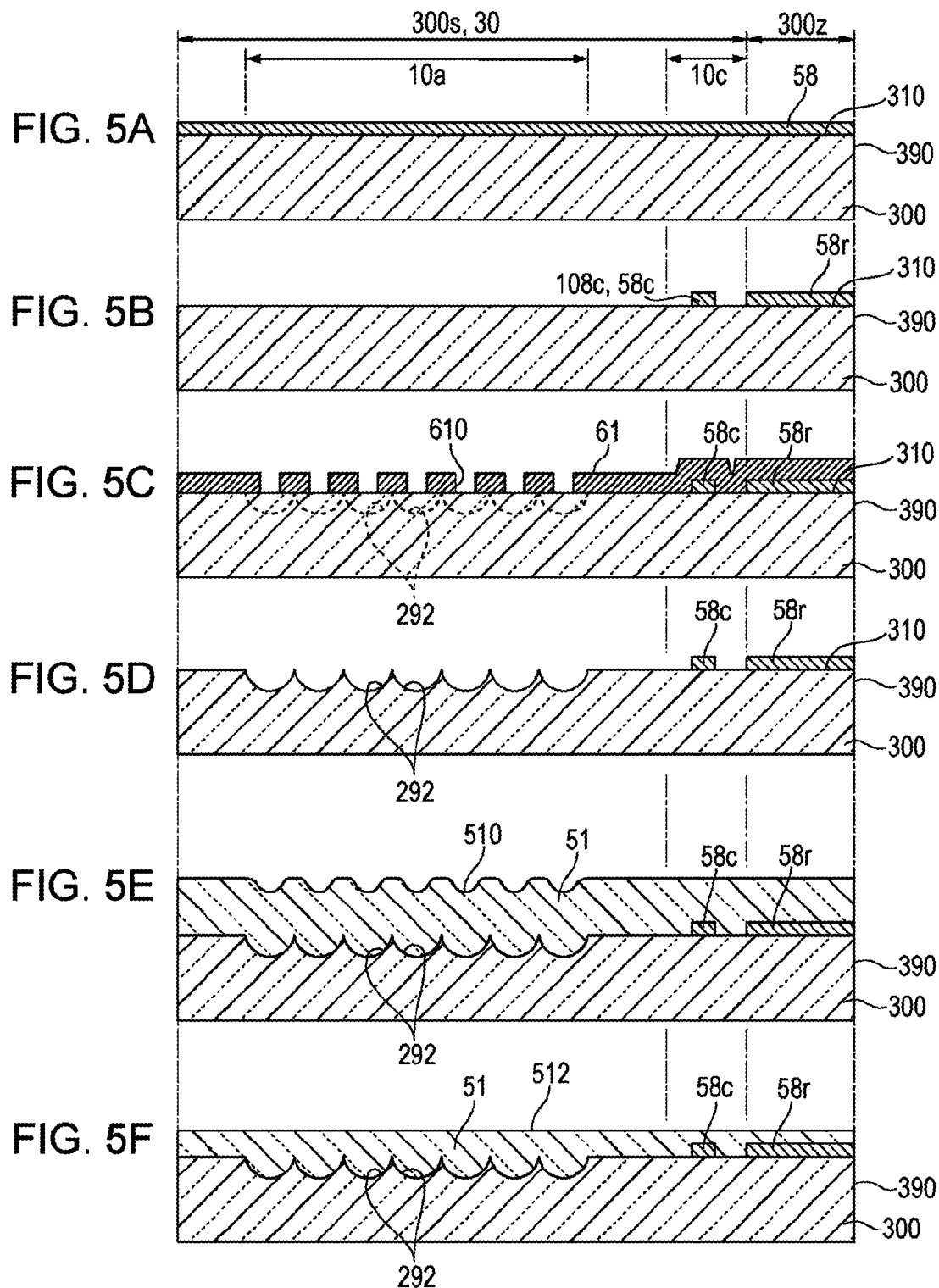

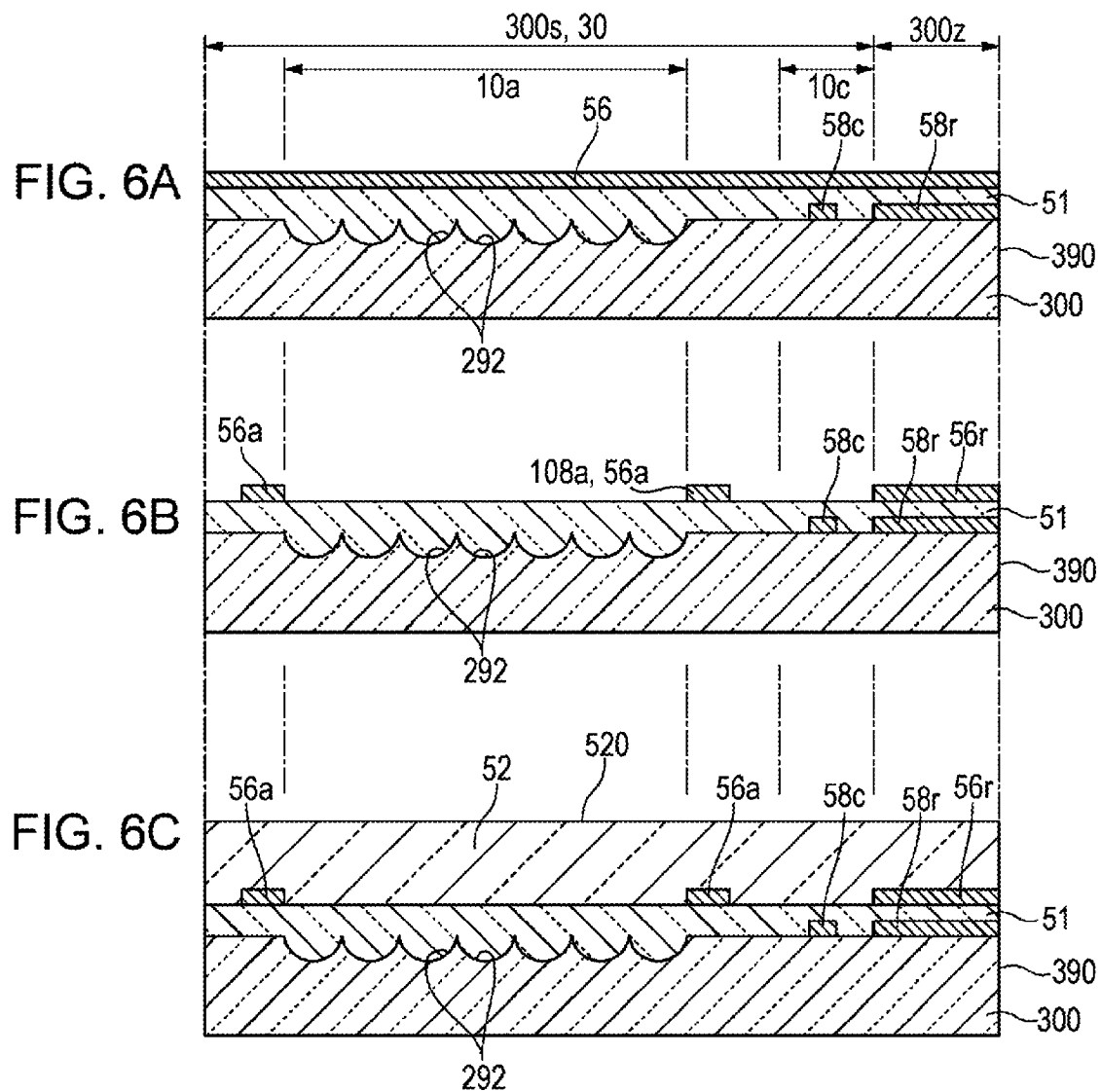

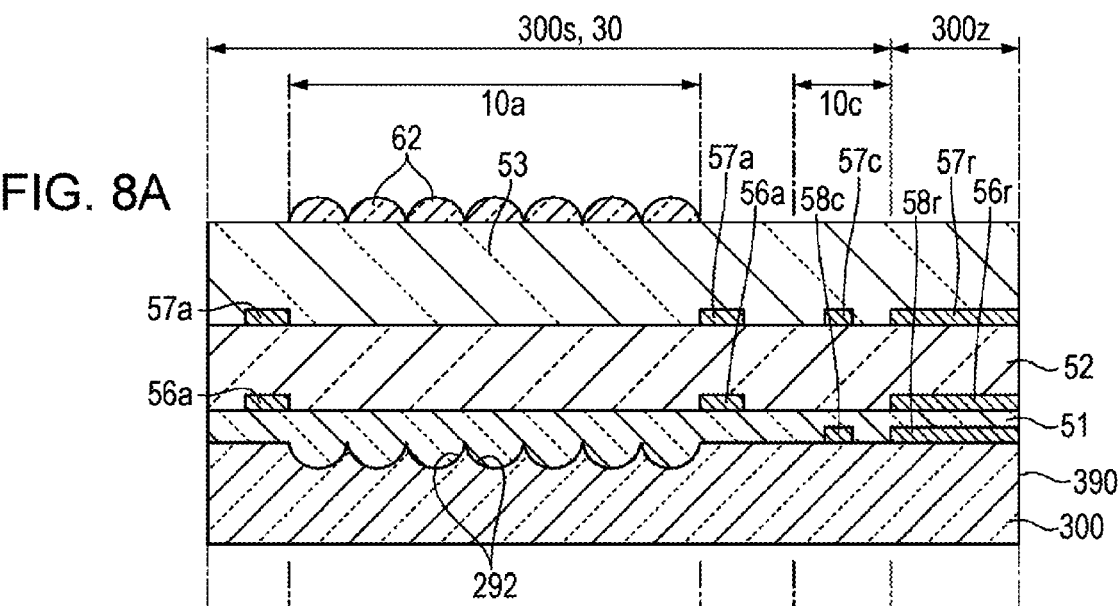
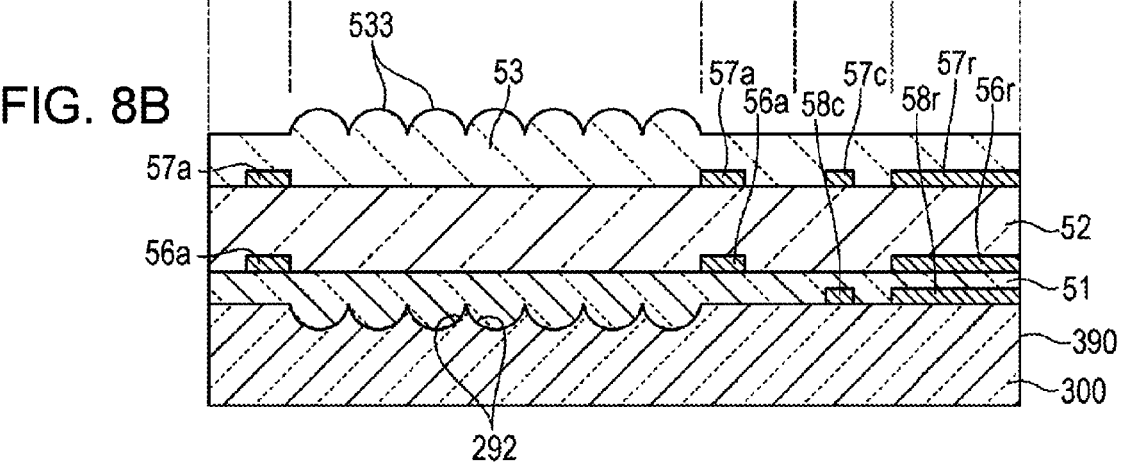

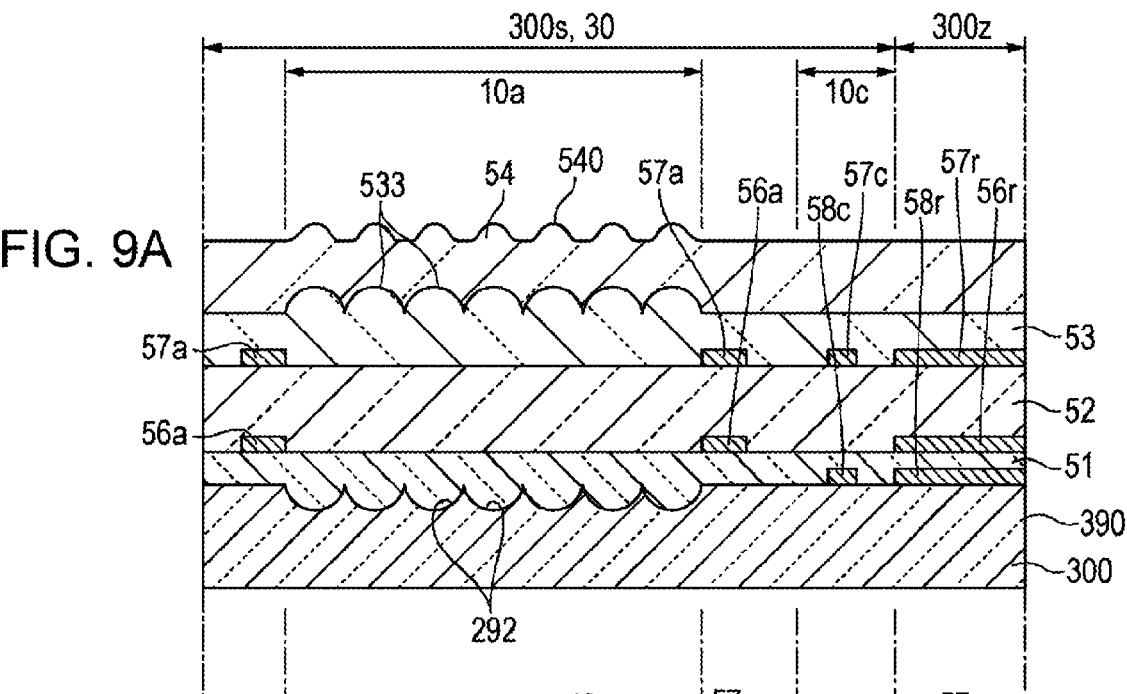
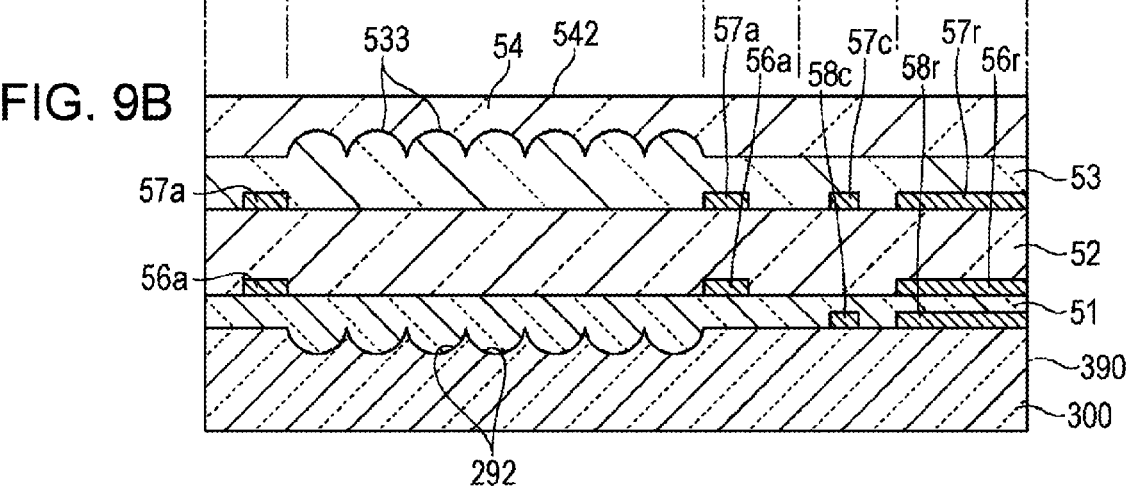

LENS ARRAY SUBSTRATE, ELECTRO-OPTICAL APPARATUS AND ELECTRONIC EQUIPMENT

BACKGROUND

1. Technical Field

The present invention relates to a lens array substrate on which a lens is formed, an electro-optical apparatus which is provided with the lens array substrate, and electronic equipment which is provided with the electro-optical apparatus.

2. Related Art

In a display area of an electro-optical apparatus (a liquid crystal device) which is used as a light valve of a projector, a plurality of pixels are disposed in a matrix shape, and in the pixel, only the light which reaches a translucent area (a pixel opening area) surrounded by a wiring or the like is imparted to display. Here, a configuration such that light from a lighting source is converged to a translucent area by configuring the electro-optical apparatus with a lens array substrate as a counter substrate has been proposed. In addition, as the lens array substrate, a configuration has been proposed such that after a first lens surface which is formed of a concave surface is formed on one side of a substrate surface of a translucent substrate, the substrate surface is covered by the first translucent lens layer which has a refractive index different from that of the translucent substrate, and then the concave surface on which the first lens surface is reflected is used as a second lens surface for the surface opposite to the side of the translucent substrate in the first lens layer (refer to JP-A-2013-57781).

Further, in the configuration disclosed in JP-A-2013-57781, a translucent protective layer is stacked on the surface opposite to the side of the translucent substrate with respect to the second lens layer that covers the second lens surface.

In the lens array substrate, it is preferable to provide an optical path length adjusting layer (a translucent layer) having a predetermined thickness on the emission side with respect to the lens in order to properly control a position in which the light emitted from a lens is converged; however, the optical path length adjusting layer (the translucent layer) having a sufficient thickness is not provided in the lens array substrate disclosed in JPA-2013-57781. For example, in the lens array substrate disclosed in JP-A-2013-57781, the protective layer having a small thickness is directly stacked with respect to the second lens layer that covers the second lens surface. In addition, in the lens array substrate disclosed in JP-A-2013-57781, since the concave surface on which the first lens surface is reflected is used as the second lens surface for the surface opposite to the side of the translucent substrate in the first lens layer, it is difficult to provide the optical path length adjusting layer (the translucent layer) having the sufficient thickness with respect to the first lens surface.

Accordingly, in a case where a two-stage is provided, it is preferable to form a first lens array by forming the first lens layer which is formed of a silicon oxinitride film, and a first translucent layer (the optical path length adjusting layer) which is formed of a silicon oxide film, after forming the first lens surface which is formed of the concave surface on one substrate surface of the translucent substrate formed of a quartz substrate or the like. Further, it is preferable to form a second lens array by forming a second lens layer which is formed of the silicon oxinitride film on the side opposite to the translucent substrate with respect to the first translucent layer, forming a second lens surface which is formed of a convex surface on the surface opposite to the side of the translucent substrate of the second lens layer, and then forming a second translucent layer (the optical path length adjusting layer) which is formed of the silicon oxide film.

However, in the above-described configuration, there is a problem in that a reflection is generated on an interface between the first lens layer which is formed of the silicon oxinitride film and the first translucent layer which is formed of the silicon oxide film, or an interface between the first translucent layer which is formed of the silicon oxide film and the second lens layer which is formed of the silicon oxinitride film, and therefore, it is likely that an amount of light contributing to a display will be reduced.

On the other hand, in a case where a single stage lens is provided, after forming the lens surface which is formed of the concave surface on one substrate surface of the translucent substrate formed of a quartz substrate or the like, for example, the lens layer which is formed of the silicon oxinitride film, the translucent layer (the optical path length adjusting layer) which is formed of the silicon oxide film, the protective layer, and a translucent electrode which is formed of an ITO film are formed in order. However, also in the above-described configuration, reflection is generated on an interface between the lens layer which is formed of the silicon oxinitride film and the translucent layer which is formed of the silicon oxide film, and therefore, it is likely that the amount of the light contributing to the display will be reduced.

SUMMARY

An advantage of some aspects of the embodiments is to provide a lens array substrate which is capable of preventing the reflection generated on an interface between a lens layer and a translucent layer (an optical path length adjusting layer), an electro-optical apparatus which is provided with the lens array substrate, and electronic equipment which is provided with the electro-optical apparatus.

According to an aspect of the embodiments, there is provided a lens array substrate including a substrate that has a first lens surface, the first lens surface includes a concave surface or a convex surface formed on one surface thereof; a first lens layer that covers one surface of the substrate, the first lens layer is translucent and has a refractive index different from that of the substrate; a first translucent layer that covers the first lens layer on the side opposite to the substrate; a second lens layer that covers the first translucent layer on the side opposite to the substrate is formed, and on which a second lens surface which is formed of the concave surface or the convex surface on a surface on the side opposite to the substrate; and a second translucent layer that covers the second lens layer on the side opposite to the substrate, in which the first translucent layer is formed so as to have the same refractive index as that of at least one of the first lens layer and the second lens layer.

In the embodiments, "the same refractive index" means the same refractive index in a wavelength area of the light which is transmitted through the lens array substrate. In addition, "the same refractive index" in the embodiments means not only a case where the refractive index is completely the same, but also a case where the refractive index is substantially the same. Here, "substantially the same refractive index" means a case where a difference of the refractive index is equal to or less than ±5%.

In the embodiments, the first translucent layer (the optical path length adjusting layer) is provided on the side opposite to the substrate of the first lens layer, the second translucent layer (the optical path length adjusting layer) is provided on the side opposite to the substrate of the second lens layer, and thus it is possible to properly control the position at which the light emitted from the lens is converged. In addition, since the first translucent layer has the same refractive index as that of at least one of the first lens layer and the second lens layer, it is possible to prevent the light from being reflected on the interface between the lens layer and the translucent layer (the optical path length adjusting layer). Therefore, it is less likely that the amount of the light contributing to the display will be reduced.

In the embodiments, it is preferable that the first translucent layer includes the same material as that of at least one of the first lens layer and the second lens layer. According to the above-described configuration, it is possible to easily realize a configuration which has the same refractive index in any wavelength region.

In the embodiments, it is preferable that the first translucent layer is formed so as to have the same refractive index as that of both of the first lens layer and the second lens layer. According to the above-described configuration, it is possible to prevent the light from being reflected on the interface between the translucent layer and the lens layer.

In the embodiments, it is preferable that the first translucent layer includes the same material as that of both the first lens layer and the second lens layer. According to the above-described configuration, it is possible to easily realize a configuration which has the same refractive index in any wavelength region.

In the embodiments, it is preferable to include a translucent protective layer that covers the second translucent layer on the side opposite to the substrate; and a electrode that is formed on the surface on the side opposite to the substrate of the protective layer, the electrode is translucent, in which a refractive index of the protective layer is a refractive index within a range between a refractive index of the second translucent layer and a refractive index of the electrode. For example, it is preferable that the second translucent layer includes the silicon oxide film (having the refractive index of 1.48), the protective layer includes the aluminum oxide film (having the refractive index of 1.67), and the electrode includes the ITO film (having the refractive index of 1.91). According to the above-described configuration, in comparison with a case where the second translucent layer and the electrode are directly in contact with each other, or a case where the refractive index of the protective layer is not within the range between the refractive index of the second translucent layer and the refractive index of the electrode, it is possible to prevent the light from being reflected on the interface on the substrate side of the electrode. Therefore, it is less likely to reduce the amount of the light contributing to the display.

According to another aspect of the embodiments, there is provided a lens array substrate including a substrate that has a lens surface, the lens surface includes a concave surface or a convex surface formed on one surface thereof; a lens layer that covers one surface of the substrate, the lens layer is translucent and has a refractive index different from that of the substrate; and a translucent layer that covers the lens layer on the side opposite to the substrate, in which the translucent layer has the same refractive index as that of the lens layer.

In the embodiments, the translucent layer (the optical path length adjusting layer) is provided on the side opposite to the substrate of the lens layer, and thus it is possible to properly control the position in which the light emitted from the lens array is converged. In addition, since the translucent layer has the same refractive index as that of the lens layer, it is possible to prevent the light from being reflected on the interface between the lens layer and the translucent layer (the optical path length adjusting layer). Therefore, it is less likely to reduce the amount of the light contributing to the display.

In the embodiments, it is preferable that the translucent layer includes the same material as that of the lens layer. According to the above-described configuration, it is possible to easily realize a configuration which has the same refractive index in any wavelength region.

In the embodiments, it is preferable to include a translucent protective layer that covers the translucent layer on the side opposite to the substrate; and an electrode that is formed on the surface on the side opposite to the substrate of the protective layer, the electrode is translucent, in which a refractive index of the protective layer is a refractive index within a range between a refractive index of the translucent layer and a refractive index of the electrode. For example, it is preferable that the translucent layer is formed of the silicon oxinitride film (having the refractive index range of 1.58 to 1.64), the protective layer is formed of the aluminum oxide film (having the refractive index range of 1.67), and the translucent electrode is formed of the ITO film (having the refractive index of 1.91). According to the above-described configuration, in comparison with a case where the translucent layer and the electrode are directly in contact with each other, or a case where the refractive index of the protective layer is not within the range between the refractive index of the translucent layer and the refractive index of the electrode, it is possible to prevent the light from being reflected on the interface on the substrate side of the electrode. Therefore, it is less likely to reduce the amount of the light contributing to the display.

According to still another aspect of the embodiments, the lens array substrate to which the embodiments is applied is used in an electro-optical apparatus, and the electro-optical apparatus includes an element substrate that faces the lens array substrate on one surface side of the substrate; and an electro-optical layer that is disposed between the element substrate and the lens array substrate.

The electro-optical apparatus is used as, for example, a light valve of a projection type display device or a direct viewing type display device. In a case where the electro-optical apparatus of the embodiments is used as the projection type display device, the projection type display device includes a light source unit that emits the light supplied to the electro-optical apparatus; and a projection optical system that projects the light modulated by the electro-optical apparatus.

BRIEF DESCRIPTION OF THE DRAWINGS

The invention will be described with reference to the accompanying drawings, wherein like numbers reference like elements.

FIG. 5A to FIG. 5F are sectional views illustrating a step of a manufacturing method of a lens array substrate according to a first embodiment of the invention.

FIG. 6A to FIG. 6C are sectional views illustrating a step of the manufacturing method of the lens array substrate according to the first embodiment of the invention.

FIG. 8A and FIG. 8B are sectional views illustrating the step of the manufacturing method of the lens array substrate according to the first embodiment of the invention.

FIG. 9A and FIG. 9B are sectional views illustrating the step of the manufacturing method of the lens array substrate according to the first embodiment of the invention.

DESCRIPTION OF EXEMPLARY EMBODIMENTS

Figure 1A:
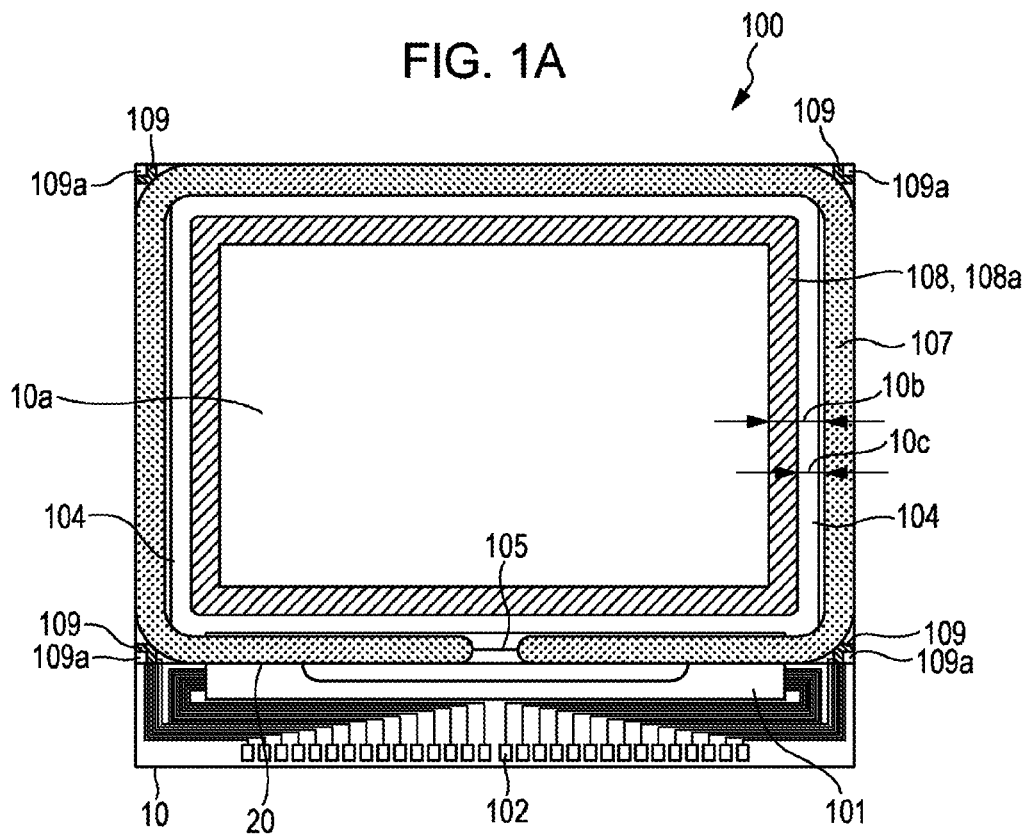
FIG. 1A and FIG. 1B are illustrative diagrams of an electro-optical apparatus according to a first embodiment.

Hereinafter, embodiments according to the present invention will be described with reference to the drawings. Meanwhile, in the drawings referred in the following description, a reduced scale is made for each layer or each member which differs so as to be a recognizable size in the drawings.

First Embodiment

Configuration of Electro-Optical Apparatus

Figure 1B:
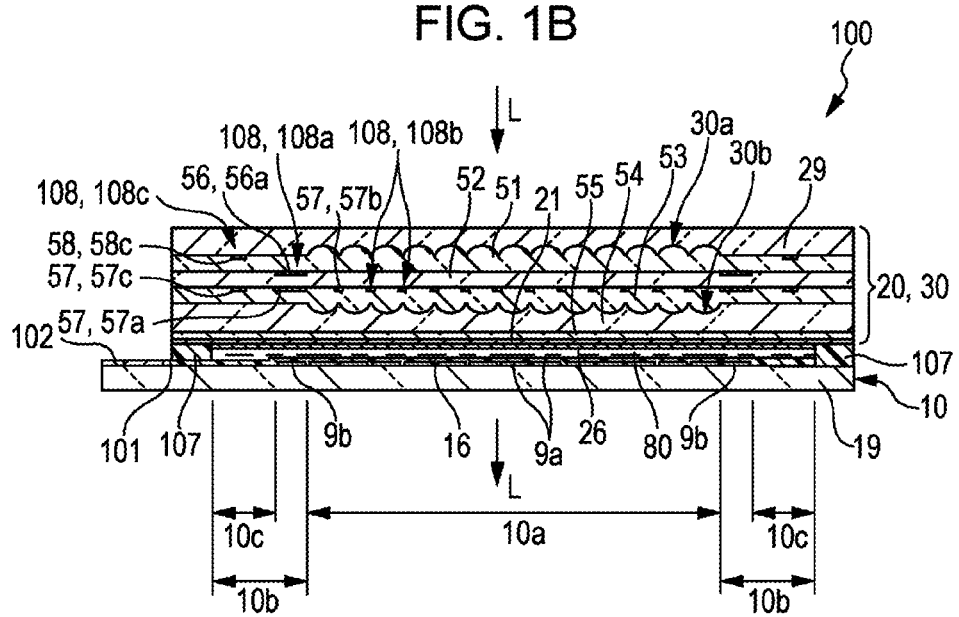

FIG. 1A and FIG. 1B are illustrative diagrams of an electro-optical apparatus 100 according to the first embodiment, FIG. 1A and FIG. 1B are respectively a plan view of the electro-optical apparatus 100 to which the first embodiment of the invention is applied when seen from the side of each of the component and a counter substrate, and a sectional view thereof.

As illustrated in FIG. 1A and FIG. 1B, in the electro-optical apparatus 100, a translucent element substrate 10 and a translucent counter substrate 20 are attached to each other with a predetermined interval therebetween by using a sealant 107, and the element substrate 10 and the counter substrate 20 face each other. The sealant 107 is formed into a frame shape so as to be arranged along an outer edge of the counter substrate 20, and an electro-optical layer 80 which is formed of a liquid crystal layer is disposed in the area which is surrounded by the sealant 107 between the element substrate 10 and the counter substrate 20. The sealant 107 is an adhesive having a photosetting property, or the photosetting property and a thermosetting property, and a gap material such as a glass fiber or glass beads is mixed into the sealant 107 so as to make a distance between both substrates reach a predetermined value. Examples of the adhesive used as the above-described sealant 107 can include an acrylic resin-based photosetting property adhesive, an epoxy resin-based photosetting property adhesive, an acrylic denaturation resin-based photosetting property adhesive, and an epoxy denaturation resin-based photosetting property adhesive (an ultraviolet-curing type adhesive or UV curing type adhesive).

The element substrate 10 and the counter substrate 20 are formed into a rectangular shape, and a display area 10a which is a rectangular area is provided near the center of the electro-optical apparatus 100. In respond to the above-described shape, the sealant 107 is also formed into the substantially rectangular shape, and a rectangular peripheral area 10b is provided between the inner periphery of the sealant 107 and the outer periphery of the display area 10a.

On the surface of the counter substrate 20 side of the element substrate 10, a data line driving circuit 101 and a plurality of terminals 102 are formed along one side of the element substrate 10, and a scanning line driving circuit 104 is formed along the other side adjacent to the one side on the outer side of the display area 10a. A flexible wiring substrate (not shown) is connected to a terminal 102, and various electric potentials and various signals are input to the element substrate 10 via the flexible wiring substrate.

In addition, on the surface of the counter substrate 20 side of the element substrate 10, a translucent pixel electrode 9a is formed of an indium tin oxide (ITO) film or the like, a pixel transistor (not shown) which is electrically connected to the pixel electrode 9a is formed into a matrix shape in the display area 10a, and an oriented film 16 is formed on the counter substrate 20 side with respect to the pixel electrode 9a. In addition, on the element substrate 10, a dummy pixel electrode 9b which is formed with the pixel electrode 9a at the same time is formed on the peripheral area 10b.

A translucent common electrode 21 which is formed of the ITO film or the like is formed on the surface side facing the element substrate 10 in the counter substrate 20, and an oriented film 26 is formed on the element substrate 10 side with respect to the common electrode 21. In the embodiment, the common electrode 21 is formed almost completely covering the surface of the counter substrate 20.

The oriented films 16 and 26 are formed of a resin film such as a polyimide, or a vapor-deposited film such as a silicon oxide film. In the embodiment, the oriented films 16 and 26 are inorganic oriented films (vertically oriented films) which are formed of the vapor-deposited film consisting of $SiO_x$ (x<2), $SiO_2$, $TiO_2$, MgO, $Al_2O_3$, $In_2O_3$, $Sb_2O_3$, $Ta_2O_5$, or the like, a liquid crystal molecule which includes a negative dielectric anisotropy used in the electro-optical layer 80 is obliquely oriented, and the electro-optical apparatus 100 is operated as a liquid crystal device in a vertical alignment (VA) mode.

On the element substrate 10, an electrode for inter-substrate conduction 109 which is used to electrically conducting between the element substrate 10 and the counter substrate 20 is formed in an area which overlaps with an angle portion of the counter substrate 20 in the outer side from the sealant 107. A material for an inter-substrate conductor 109a including a conductive particle is disposed in the electrode for inter-substrate conduction 109, and the common electrode 21 of the counter substrate 20 is electrically connected to the element substrate 10 via the material for the inter-substrate conductor 109a and the electrode for inter-substrate conduction 109. For this reason, a common potential is applied to the common electrode 21 from the element substrate 10.

In the electro-optical apparatus 100 of the embodiment, the pixel electrode 9a and the common electrode 21 are formed of the translucent conductive film, and the electro-optical apparatus 100 is configured as a transmission type liquid crystal device. An image is displayed in the above-described electro-optical apparatus 100 in such a manner that light is modulated while the light which is incident from the substrate on one side of the element substrate 10 or the counter substrate 20 is emitted through the substrate on the other side. In the embodiment, as illustrated by using an arrow L, the light is modulated for each pixel by the electro-optical layer 80 while the light incident from the counter substrate 20 is emitted through the element substrate 10, and thereby the image is displayed.

Configuration of Metal Layer 108

Figure 2:
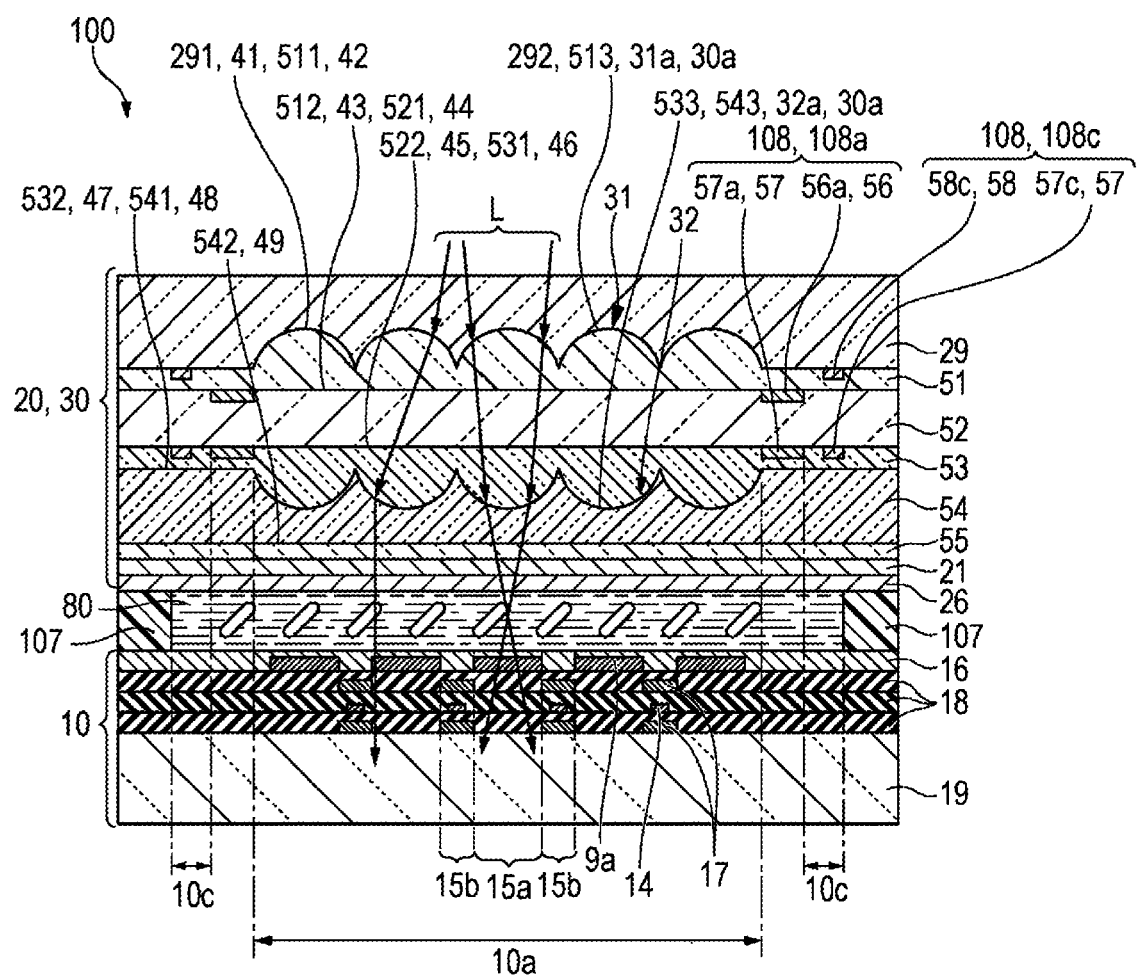
FIG. 2 is an illustrative diagram of a schematic configuration of a section of the electro-optical apparatus as illustrated in FIG. 1A and FIG. 1B.

FIG. 2 is an illustrative diagram of a schematic configuration of a cross section of the electro-optical apparatus 100 as illustrated in FIG. 1A and FIG. 1B. As illustrated in FIG. 1A to FIG. 2, in the counter substrate 20, the light shielding metal layer which is formed of metal or the metallic compound 108 is formed on the surface opposite to the side of the element substrate 10 with respect to the common electrode 21. The metal layer 108 is formed, for example, as a frame shaped parting 108a which extends along the outer periphery of the display area 10a. In addition, the metal layer 108 is formed in an area overlapping with an area interposed between the adjacent pixel electrodes 9a in a plane view, as a light shielding layer 108b. Further, the metal layer 108 is formed in a peripheral area 10b or the like, as an alignment mark 108c. In the embodiment, in the peripheral area 10b, the alignment mark 108c is provided in a mark forming area 10c which is interposed between an outer periphery of the parting 108a and an inner periphery of the sealant 107.

Configuration of Lens Array Substrate 30

Figure 3:
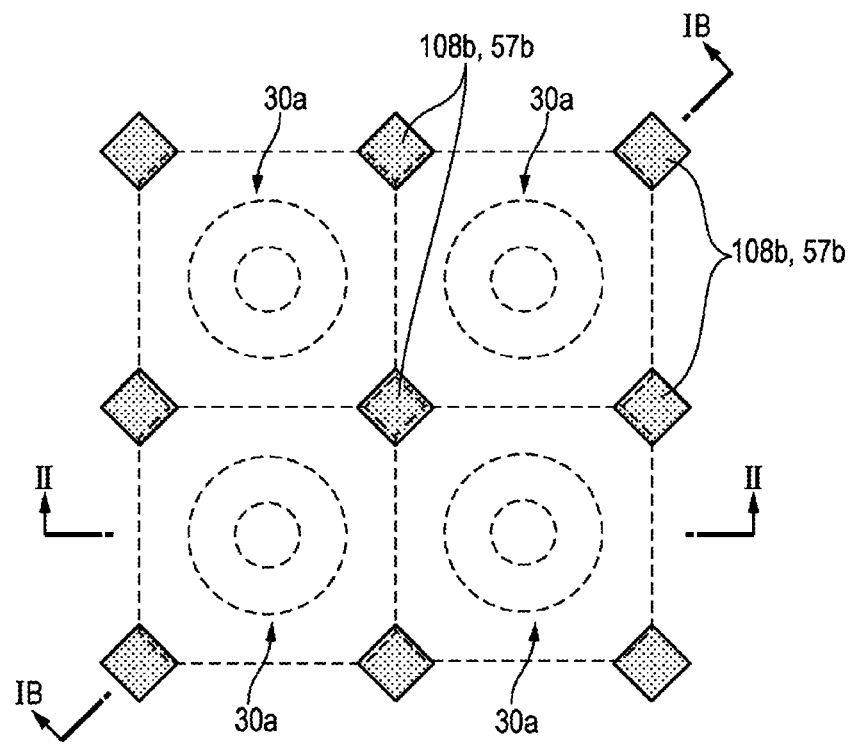
FIG. 3 is an illustrative diagram of a plane positional relationship between a lens and a light shielding layer in the electro-optical apparatus as illustrated in FIG. 1A and FIG. 1B.

FIG. 3 is an illustrative diagram of a plane positional relationship between a lens 30a and the light shielding layer 108b in the electro-optical apparatus 100 as illustrated in FIG. 1A and FIG. 1B.

As illustrated in FIG. 2, the element substrate 10 includes a translucent substrate 19, and a plurality of interlayer insulators 18 are stacked on the surface of the element substrate 10 on the counter substrate 20 side of the translucent substrate 19. In addition, in the element substrate 10, by using the space between the translucent substrate 19 and the interlayer insulator 18, or between the interlayer insulators 18, a wiring 17 and a pixel transistor 14 can be formed to extend along an area overlapping with the space between the pixel electrodes 9a which are adjacent to each other, and the light is not transmitted through the wiring 17 and the pixel transistor 14.

For this reason, in the element substrate 10, among the areas overlapping with the pixel electrode 9a in a plane view, an area overlapping with the wiring 17 and the pixel transistor 14 in a plane view, and an area overlapping with the area interposed between the pixel electrodes 9a which are adjacent to each other in a plane view correspond to light shielding areas 15b through which the light is not transmitted, and in the area overlapping with the pixel electrodes 9a in a plane view, an area which does not overlap with the wiring 17 and the pixel transistor 14 in a plane view corresponds to a opening area 15a (a translucent area). Accordingly, only the light which is transmitted through the opening area 15a is imparted to the display of an image, and the light directed to the light shielding area 15b is not imparted to the display of the image.

Here, in the embodiment, the counter substrate 20 is configured as a lens array substrate 30 on which a plurality of the lenses 30a are formed in such a manner as to respectively overlap with the plurality of the pixel electrodes 9a in a plane view, and the lens array substrate 30 causes the light emitted from the light source to be converged in the opening area 15a. In addition, a multistage lens array is formed along the advancing direction of the light in the counter substrate 20 (the lens array substrate 30) of the embodiment, and in the embodiment, a first lens array 31 which is positioned on the side on the light-incidence side, and a second lens array 32 which is positioned on the element substrate 10 with respect to the first lens array 31. For this reason, in the electro-optical apparatus 100 of the invention, by using the first lens array 31 and the second lens array 32, the light emitted from the light source is converged in the opening area 15a and the light incident on the electro-optical layer 80 is made to be parallel. Therefore, the inclination of the optical axis of the light incident on the electro-optical layer 80 is small, and thus it is possible to reduce phase shift in the electro-optical layer 80, and prevent the reduction of transmittance or the contrast. Particularly, in the embodiment, since the electro-optical apparatus 100 is configured as the liquid crystal device of a vertical alignment (VA) mode, the contrast is likely to be decreased by the inclination of the optical axis of the light incident on the electro-optical layer 80; however, according to the invention, the contrast is less likely to be decreased.

Here, as illustrated in FIG. 3, the lens 30a is arranged so as to be in contact with the adjacent lens 30a, and the light shielding layer 108b illustrated in FIG. 1A and FIG. 1B and FIG. 2 is formed in an area overlapping with an area which is surrounded by four lenses 30a in a plane view. For this reason, the light shielding layer 108b is illustrated in FIG. 1B as a cross section taken along line IB-IB of FIG. 3, and the light shielding layer 108b is illustrated in FIG. 2 as a cross section taken along line II-II of FIG. 3. Meanwhile, the light shielding layer 108b may overlap with the end portion of the lens 30a in a plane view in some cases, but is formed so as not to overlap with the center of the lens 30a in a plane view.

Detailed Description of Lens Array Substrate 30

Referring to FIG. 2 again, in the embodiment, when it comes to configuring the lens array substrate 30 (the counter substrate 20), a first concavity 292 which is formed of the concave surface is formed on a first surface 41 which is formed of a substrate surface 291 (the surface side opposite to element substrate 10) of one of several translucent substrates 29 (a first lens surface). In addition, on the substrate surface 291 (the first surface 41) of one of the translucent substrates 29, a first translucent lens layer 51, a first translucent layer 52, a second translucent lens layer 53, a second translucent layer 54, and a translucent protective layer 55, which are described later, are stacked in order. The first concavity 292 overlaps with the pixel electrode 9a in a plane view.

Among the plurality of translucent films, the first lens layer 51 is provided with a surface 511 (a second surface 42) which covers the substrate surface 291 (the first surface 41) of the translucent substrate 29, a flat surface 512 (a third surface 43) which is positioned on the surface opposite to the side of the surface 511 (the second surface 42). In addition, the surface 511 of the first lens layer 51 (the second surface 42) includes a first hemispherical convexity 513 with which the first concavity 292 of the translucent substrate 29 is filled.

Here, the translucent substrate 29 and the first lens layer 51 have different refractive indexes from each other, and the first concavity 292 and the first convexity 513 configure a lens 31a (the lens 30a) of the first lens array 31. In the embodiment, the refractive index of the first lens layer 51 is greater than the refractive index of the translucent substrate

29. For example, the translucent substrate 29 is formed of a quartz substrate (a silicon oxide and $SiO_2$) and the refractive index thereof is 1.48, whereas the first lens layer 51 is formed of the silicon oxinitride film (SiON) and the refractive index thereof is 1.58 to 1.68. Therefore, the lens 31a includes a power source causing the light emitted from the light source to be converged.

The first translucent layer 52 covers the first lens layer 51 on the side opposite to the translucent substrate 29, and is provided with a surface 521 (a fourth surface 44) which covers the flat surface 512 of the first lens layer 51 (a third surface 43), and a surface 522 (a fifth surface 45) which is positioned on the side opposite to the surface 521 (the fourth surface 44). In the embodiment, the first translucent layer 52 has the same refractive index as that of the first lens layer 51. More specifically, the first translucent layer 52 is formed of the silicon oxinitride film (SiON) similarly to the first lens layer 51. However, the nitrogen content of the first translucent layer 52 is slightly different from that of the first lens layer 51, and the refractive index thereof is 1.58 to 1.64. The first translucent layer 52 is a first optical path length adjusting layer which adjusts an optical path length between the first lens array 31 and the second lens array 32.

The second lens layer 53 covers the first translucent layer 52 on the side opposite to the translucent substrate 29 and includes a surface 531 (a sixth surface 46) which covers the surface 522 (the fifth surface 45) of the first translucent layer 52, and a surface 532 (a seventh surface 47) which is positioned on the side opposite to the surface 531 (the sixth surface 46). A convex surface which protrudes to a surface opposite to the side of the translucent substrate 29, or a concave surface which is recessed toward the translucent substrate 29 is formed at a position on the surface 532 (the seventh surface 47), which overlaps with the first concavity 292 in a plane view.

In the embodiment, a plurality of second convexities 533 (the second lens surface) which protrude to surface opposite to the side of the translucent substrate 29 in a hemispherical shape are formed at a position on the surface 532 of the second lens layer 53 (the seventh surface 47), which overlaps with the first concavity 292 in a plane view.

A second translucent layer 54 covers the second lens layer 53 on the side opposite to the translucent substrate 29, and a second concavity 543 which is formed of the concave surface and in which the second convexity 533 of the second lens layer 53 is positioned on the inner side is formed on a surface 541 (an eighth surface 48) which covers the surface 532 of the second lens layer 53 (the seventh surface 47). The second translucent layer 54 is provided with a flat surface 542 (a ninth surface 49) which is positioned on the surface opposite to the side of the surface 541 (the eighth surface 48).

Here, the second lens layer 53 and the second translucent layer 54 have different refractive indexes from each other, and the second concavity 543 and the second convexity 533 configure the lens 32a of the second lens array 32 (the lens 30a). In the embodiment, the refractive index of the second lens layer 53 is greater than the refractive index of the second translucent layer 54. For example, the second lens layer 53 is formed of the silicon oxinitride film (SiON) and the refractive index thereof is 1.58 to 1.64, whereas the second translucent layer 54 is formed of the silicon oxide film ($SiO_x$) and the refractive index thereof is 1.48. Therefore, the lens 31a includes a power source causing the light emitted from the light source to be converged. In the embodiment, the second translucent layer 54 is a second optical path length adjusting layer which adjusts an optical path length between the second lens array 32 and the element substrate 10.

In the embodiment, a translucent protective layer 55 is formed on the flat surface 542 (the ninth surface 49) of the second translucent layer 54, and with respect to the protective layer 55, and a translucent common electrode 21 (a translucent electrode) is formed on the side opposite to the second translucent layer 54 or the translucent substrate 29. In addition, with respect to the common electrode 21, the oriented film 26 is formed on the side opposite to the protective layer 55 or the translucent substrate 29.

Here, the refractive index of the protective layer 55 is within a range between the refractive index of the second translucent layer 54 and the refractive index of the translucent electrode. More specifically, the second translucent layer 54 is formed of the silicon oxinitride film (having the refractive index is 1.48), the protective layer 55 is formed of the aluminum oxide film (having the refractive index is 1.67), and the common electrode 21 (having the translucent electrode) is formed of the ITO film (having the refractive index is 1.91).

Detailed Description of Metallic Film 108

In the lens array substrate 30 of the embodiment, the metal layer 108 (the parting 108a, the light shielding layer 108b, and the alignment mark 108c, as described later, is formed of a first metal layer 56, a second metal layer 57, and a third metal layer 58 which are formed between the translucent films.

Specifically, on the lens array substrate 30, as the frame shaped parting 108a extending along the outer periphery of the display area 10a, a parting 56a which is formed of the first metal layer 56 is formed between the flat surface 512 of the first lens layer 51 (the third surface 43) and the surface 52 of the first translucent layer 521 (the fourth surface 44), and the parting 57a which is formed of the second metal layer 57 is formed between the surface 522 of the first translucent layer 52 (the fifth surface 45) and the surface 531 of the second lens layer 53 (the sixth surface 46).

In addition, in the mark forming area 10c, as the alignment mark 108c, the alignment mark 57c which is formed of the second metal layer 57 is formed between the surface 522 of the first translucent layer 52 (the fifth surface 45) and the surface 531 of the second lens layer 53 (the sixth surface 46), and the alignment mark 57c is used for the positioning performed at the time of forming the second convexity 533 on the surface 532 of the second lens layer 53 (the seventh surface 47). Further, in the mark forming area 10c, as the alignment mark 108c, the alignment mark 58c which is formed of the third metal layer 58 is formed between the substrate surface 291 (the first surface 41) of the translucent substrate 29 and the surface 511 of the first lens layer 51 (the second surface 42), and the alignment mark 58c is used for the positioning performed at the time of forming the first concavity 292 on the substrate surface 291 (the first surface 41) of the translucent substrate 29.

In addition, the light shielding layer 57b which is formed of the second metal layer 57 is formed in the display area 10a, as the light shielding layer 108b illustrated in FIG. 1B and FIG. 3. The light shielding layer 57b overlaps with an end portion of the lens 30a in a plane view in some cases, but does not overlap with the center of the lens 30a in a plane view.

In the embodiment, the metal layer 108 (the first metal layer 56, the second metal layer 57, and the third metal layer 58) is formed of a metallic film such as Ti (titanium), Al (aluminum), Cr (chrome), W (tungsten), Ta (tantalum), Mo (molybdenum), or Pd (palladium), or a metallic compound film thereof such as a nitride film. In addition, the metal layer 108 may be any one of the above-described metallic films, a single layer film of the metallic compound film, or a plurality of films.

Manufacturing Method of Lens Array Substrate 30

Figure 4:
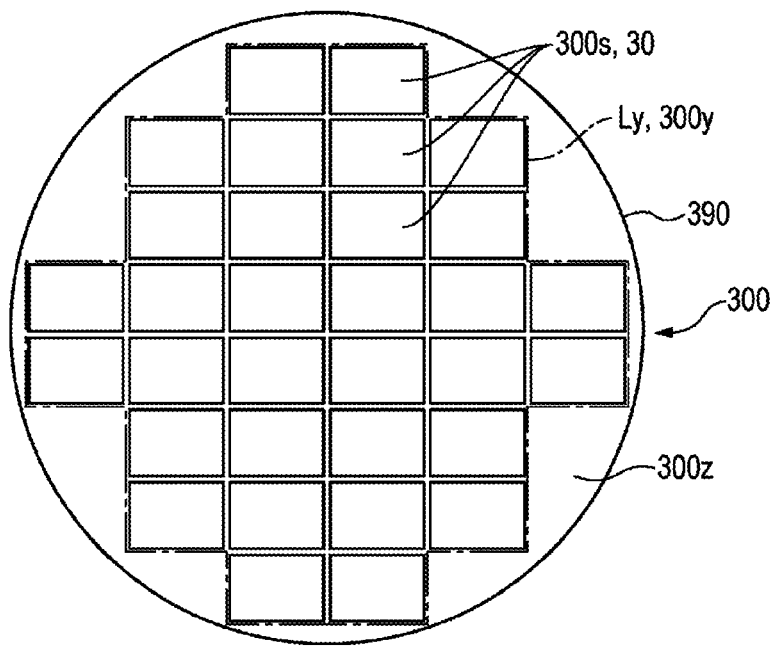
FIG. 4 is an illustrative diagram of a mother substrate used in manufacturing the lens array substrate according to the invention.

FIG. 4 is an illustrative diagram of a mother substrate 300 used in manufacturing the lens array substrate 30 according to the first embodiment of the invention. FIG. 5A to FIG. 10B are sectional views illustrating the step of the manufacturing method of the lens array substrate 30 according to the first embodiment of the invention. Further, in FIG. 5A to FIG. 10B, and conversely in FIG. 1B and FIG. 2, the substrate surface 291 of the translucent substrate 29 (the substrate surface 310 of the mother substrate 300) which is used to form the lens array substrate 30 faces upward in the drawings.

As illustrated in FIG. 4, the mother substrate 300 which is formed of a quartz substrate which is larger than the lens array substrate 30 is used in order to manufacture the lens array substrate 30. The mother substrate 300 is provided with a plurality of areas 300s which are cut out as the lens array substrate 30, and the first lens array 31, the second lens array 32, the common electrode 21, the oriented film 26, and the like which are described with reference to FIG. 2 are formed in the area 300s, and then the mother substrate 300 is cut out along the area 300s, thereby acquiring the lens array substrate 30 of a single unit size. Accordingly, in the mother substrate 300, the area (the area surrounded by a dashed line Ly) which is obtained by being cut out the plurality of the lens array substrate 30 corresponds to an effective area 300y, and areas other than the above-described area correspond to a removed area 300z which is removed in a cutting step.

When it comes to manufacturing the lens array substrate 30 by using such a mother substrate 300, in the embodiment, the following steps are performed in order.

Third metal layer forming step
Third metal layer patterning step
Concavity forming step
First lens layer forming step
First flattening step
First metal layer forming step
First metal layer patterning step
First translucent layer forming step
Second metal layer forming step
Second metal layer patterning step
Second lens layer forming step
Second lens forming step
Second translucent layer forming step
Second flattening step First, in the third metal layer forming step as illustrated in FIG. 5A, the third metal layer 58 which is formed of metal or a metallic compound is formed on the substrate surface 310 of the mother substrate 300 by using a sputtering method, an evaporation method or the like. The third metal layer 58 is formed of, for example, the stacked layers of the titanium nitride and aluminum.

Next, in the third metal layer patterning step as illustrated in FIG. 5B, the third metal layer 58 is etched in a state where an etching mask (not shown) is formed on the surface opposite to the side of the mother substrate 300 of the third metal layer 58, and the third metal layer 58 is removed from the position overlapping with at least the center of the first concavity 292 (refer to FIG. 2) in a plane view. In addition, the third metal layer 58 remains as a third buffer layer 58r throughout the entirety of the removed area 300z which includes at least the end portion 390 of the entire circumstance of the mother substrate 300. In the embodiment, the third metal layer 58 is removed from the entire display area 10a and the third metal layer 58 remains as an alignment mark 58c in the mark forming area 10c, in the area 300s from which the lens array substrate 30 is acquired.

Next, in the concavity forming step as illustrated in FIG. 5C and FIG. 5D, the first concavity 292 (the first lens surface) is formed on the substrate surface 310 of the mother substrate 300. More specifically, as illustrated in FIG. 5C, after an etching mask 61 which overlaps with an opening portion 610 at the center of the first concavity 292 in a plane view is formed on the substrate surface 310 of the mother substrate 300, the isotropic etching is performed by using an etchant containing hydrofluoric acid. As a result, the first concavity 292 which is formed of the concave surface with the opening portion 610 as a main portion thereof is formed on the substrate surface 310 of the mother substrate 300. Thereafter, as illustrated in FIG. 5D, the etching mask 61 is removed. In the above-described concavity forming step, the positioning of an exposure mask or the like is performed in the photolithography step at the time of forming the etching mask 61, based on the alignment mark 58c.

Next, in the first lens layer forming step as illustrated in FIG. 5E, the first translucent lens layer 51 which has a different refractive index from that of the mother substrate 300 is formed on the entirety of the substrate surface 310 by using a plasma chemical vapor deposition (CVD) method or the like. At the same time, the concavity caused by the first concavity 292 is formed on a surface 510 on the surface opposite to the side of the mother substrate 300 of the first lens layer 51, and thus in the first flattening step as illustrated in FIG. 5F, the surface 510 of the first lens layer 51 is flattened by using a chemical mechanical polishing (CMP) process, and is set as a flat surface 512. In the embodiment, the first lens layer 51 is formed of the silicon oxinitride film (SiON).

Next, in the first metal layer forming step as illustrated in FIG. 6A, the first metal layer which is formed of metal or a metallic compound 56 is formed on the flat surface 512 of the first lens layer 51 by the sputtering method, the evaporation method or the like. The first metal layer 56 is formed of, for example, the stacked layers of the titanium nitride and aluminum.

Next, in the first metal layer patterning step as illustrated in FIG. 6B, the first metal layer 56 is etched in a state where an etching mask (not shown) is formed on the surface opposite to the side of the mother substrate 300 of the first metal layer 56, and the first metal layer 56 is removed from the position overlapping with at least the center of the first concavity 292 in a plane view. In addition, the first metal layer 56 remains as a first buffer layer 56r throughout the entirety of the removed area 300z which includes at least the end portion 390 of the entire circumstance of the mother substrate 300. In the embodiment, the first metal layer 56 remains as the parting 56a in the display area 10a in the area 300s from which the lens array substrate 30 is acquired.

Next, in the first translucent layer forming step as illustrated in FIG. 6C, the first translucent layer 52 is formed on the surface opposite to the side of the mother substrate 300 of the first lens layer 51 and the first metal layer 56 by the plasma CVD method or the like. Meanwhile, the flattening process may be performed on a surface 520 on the side opposite to the mother substrate 300 of the first translucent layer 52 by using the CMP process or the like, but in the embodiment, the flattening process of the first translucent layer 52 will be omitted. In the embodiment, the first translucent layer 52 is formed of the silicon oxinitride film (SiON) similar to the first lens layer 51.

Figure 7A:
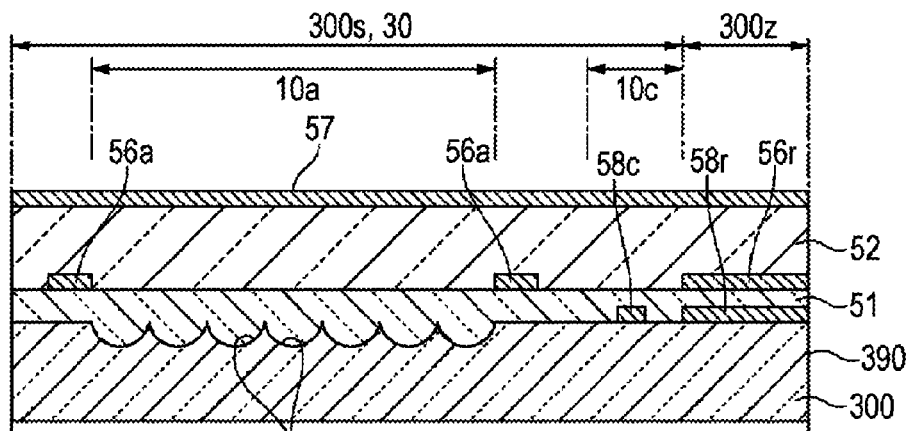
FIG. 7A to FIG. 7C are sectional views illustrating the step of the manufacturing method of the lens array substrate according to the first embodiment of the invention.

Next, in the second metal layer forming step as illustrated in FIG. 7A, the second metal layer which is formed of metal or the metallic compound 57 is formed on the surface 522 of the first translucent layer 52 by the sputtering method or the like. The second metal layer 57 is formed of, for example, the stacked layers of the titanium nitride and aluminum.

Figure 7B:
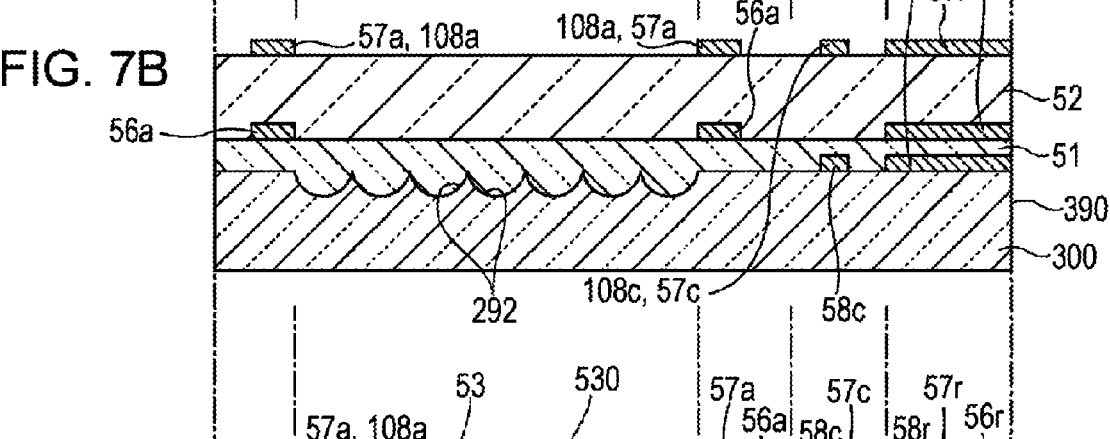

Next, in the second metal layer patterning step as illustrated in FIG. 7B, the second metal layer 57 is etched in a state where an etching mask (not shown) is formed on the surface opposite to the side of the mother substrate 300 of the second metal layer 57, and the second metal layer 57 is removed from the position overlapping with at least the center of the first concavity 292 in a plane view. In addition, the second metal layer 57 remains as a second buffer layer 57r throughout the entirety of the removed area 300z which includes at least the end portion 390 of the entire circumstance of the mother substrate 300. In the embodiment, the second metal layer 57 remains as the parting 57a and the light shielding layer 57b illustrated in FIG. 1B and FIG. 3 remains, in the display area 10a in the area 300s from which the lens array substrate 30 is acquired. In addition, the second metal layer 57 remains as the alignment mark 57c in the mark forming area 10c.

Figure 7C:
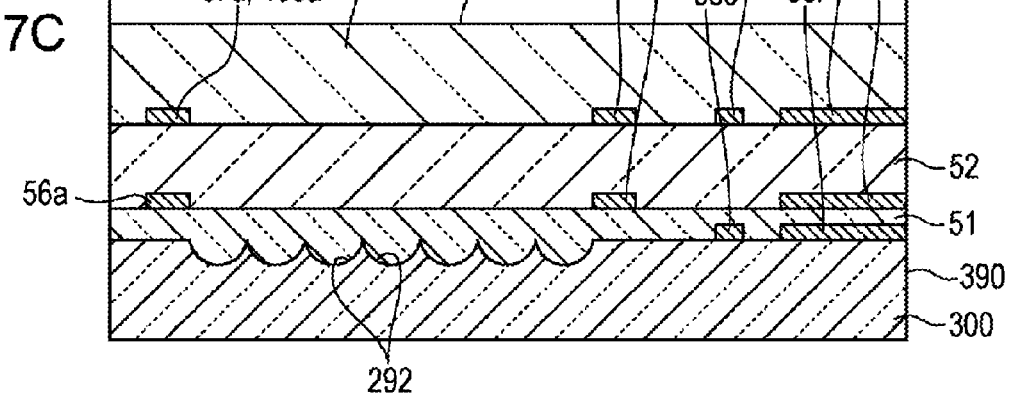

Next, in the second lens layer forming step as illustrated in FIG. 7C, the second lens layer 53 is formed on the surface opposite to the side of the mother substrate 300 of the first translucent layer 52 and the second metal layer 57 (a parting 57a, a light shielding layer 57b, and an alignment mark 57c) through the plasma CVD method or the like. Meanwhile, the flattening process may be performed on a surface 530 on the surface opposite to the side of the mother substrate 300 of the second lens layer 53 by using the CMP process or the like. In the embodiment, the second translucent layer 53 is formed of the silicon oxinitride film (SiON) similar to the first lens layer 51 and the first translucent film 50.

Next, in the second lens forming process as illustrated in FIG. 8A and FIG. 8B, the convex surface which protrudes to the side opposite to the mother substrate 300, or the concave surface which is recessed toward the mother substrate 300 is formed at a position on the surface on the side opposite to the mother substrate 300 of the second lens layer 53, which overlaps with the first concavity 292 in a plane view. In the embodiment, the second convexity 533 (the second lens surface, or the convex surface) which protrudes to the side opposite to the mother substrate 300 in a hemispherical shape is formed at a position on the surface 530 on the side opposite to the mother substrate 300 of the second lens layer 53, which overlaps with the first concavity 292 in a plane view.

More specifically, as illustrated in FIG. 8A, after the hemispherical concavity 62 is formed at a position where the first concavity 292 overlaps with a certain portion of the surface 530 on the surface opposite to the side of the mother substrate 300 of the second lens layer 53 in a plane view, the surface 530 which is formed on the surface opposite to the side of the mother substrate 300 of the concavity 62 and the second lens layer 53 etched through a dry etching process by using an inductively coupled plasma (ICP) apparatus or the like. As a result, as illustrated in FIG. 8B, the second convexity 533 is formed on the surface 530 on the surface opposite to the side of the mother substrate 300 of the second lens layer 53.

The above-described concavity 62 is formed in such a manner that the surface thereof is coated with a positive photosensitive resin of about 10 μm, and the photosensitive resin is exposed by using a gray scale mask or the like, and then developed. At the same time, the gray scale mask is used in such a manner as to form a fine hole within a grid size which is below a resolution limit of an exposure device used when exposing the light, and controls the light transmittance by changing the size of the hole. Note that, the light transmittance is designed in advance so as to become higher from the center portion to the outer periphery portion. In addition, as a method of forming the concavity 62, in addition to the above-described photolithography method, a reflow method of performing a reflow process using the heat, or a multiple exposing method by using a plurality of photo masks of which the diameter of the opening portion changes gradually can be exemplified.

Next, in the second translucent layer forming step as illustrated in FIG. 9A, the second translucent layer 54 on the surface opposite to the side of the mother substrate 300 of the second lens layer 53 is formed by using the plasma CVD method or the like. At the same time, the convexity of the second convexity 533 is formed on a surface 540 on the surface opposite to the side of the mother substrate 300 of the second translucent layer 54, and thus in the second flattening step as illustrated in FIG. 9B, the surface 540 of the second translucent layer 54 is flattened by using a chemical mechanical polishing (CMP) process, and is set as a flat surface 542. In the embodiment, the second translucent layer 54 is formed of the silicon oxide film ($SiO_x$).

Figure 10A:
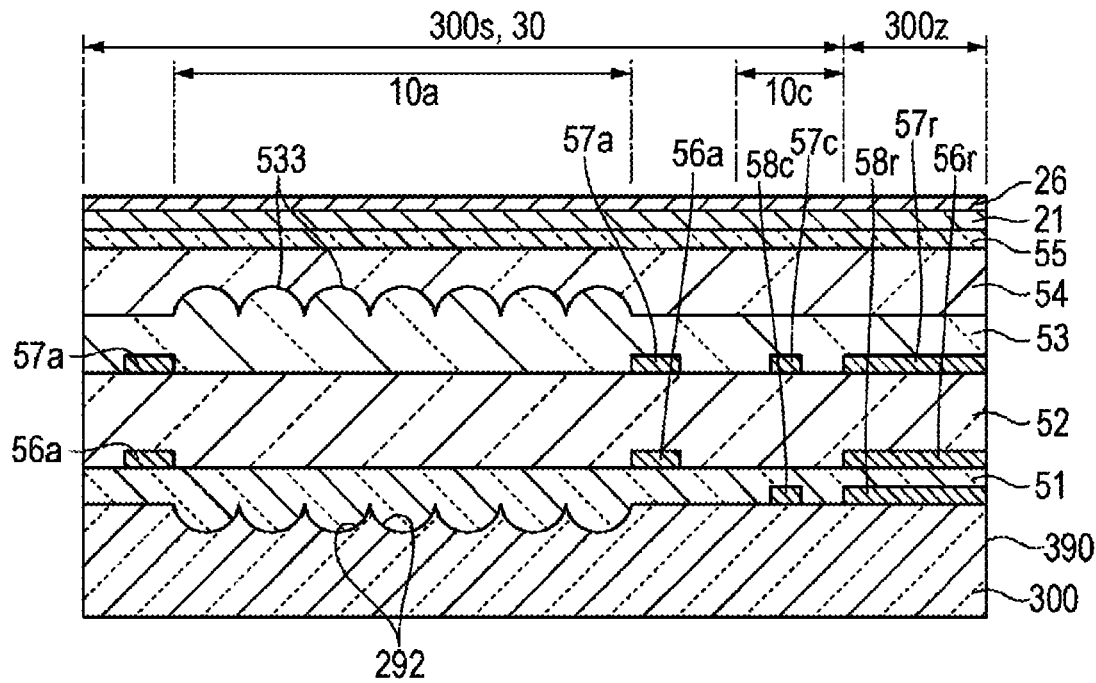
FIG. 10A and FIG. 10B are sectional views illustrating the step of the manufacturing method of the lens array substrate according to the first embodiment of the invention.

Next, as illustrated in FIG. 10A, the protective layer 55 which is formed of an aluminum oxide film, the common electrode 21 which is formed of an ITO film, and oriented film 26 are formed.

Figure 10B:
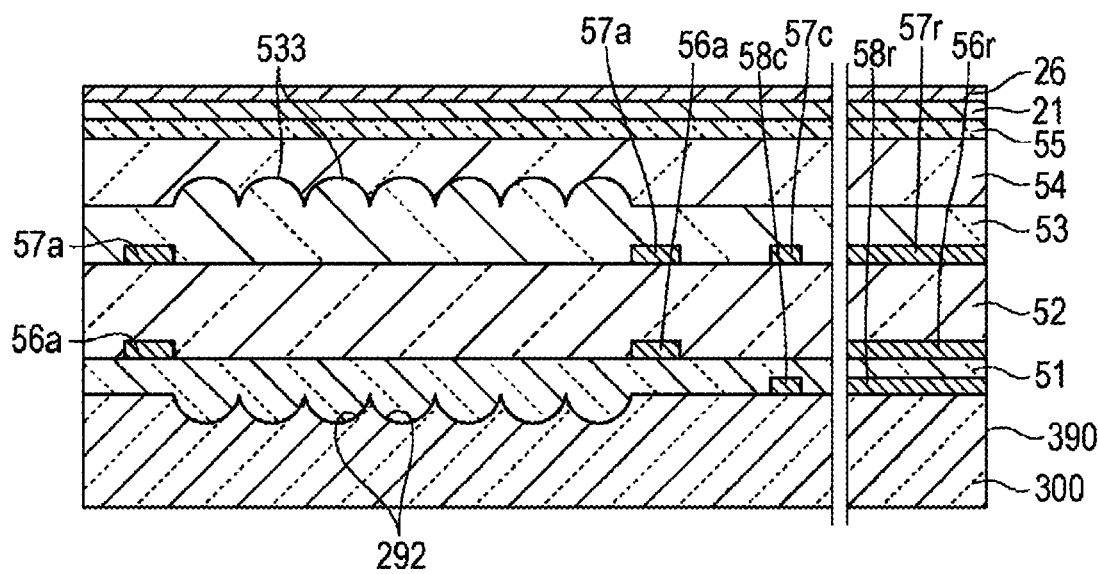

Next, in the cutting step as illustrated in FIG. 10B, the electro-optical apparatus 100 is manufactured by using the lens array substrate 30 as the counter substrate 20 after acquiring the lens array substrate 30 by cutting out the mother substrate 300.

Main Effects of the Invention

As described above, in the embodiment, the first translucent layer 52 (the optical path length adjusting layer) is provided on the side opposite to the translucent substrate 29 of the first lens layer 51, the second translucent layer 54 (the optical path length adjusting layer) is provided on the side opposite to the translucent substrate 29 of the second lens layer 53, and thus it is possible to properly control the position in which the light emitted from the lenses 31a and 32a is converged.

In addition, the first translucent layer 52 is formed of the same material as that of the first lens layer 51 and the second lens layer 53, and thus has the same refractive index as that of the first lens layer 51 and the second lens layer 53. For this reason, it is possible to prevent the light from being reflected not only on the interface between the first translucent layer 52 and the first lens layer 51, but also on the interface between the first translucent layer 52 and the second lens layer 53. Therefore, it is less likely to reduce the amount of the light contributing to the display.

Further, the second translucent layer 54 is formed of the silicon oxide film (having the refractive index of 1.48), the protective layer 55 is formed of the aluminum oxide film (having the refractive index of 1.67), and the common electrode 21 (having the translucent electrode) is formed of the ITO film (having the refractive index of 1.91). For this reason, the refractive index of the protective layer 55 is within a range between the refractive index of the second translucent layer 54 and the refractive index of the common electrode 21. Accordingly, in comparison with a case where the second translucent layer 54 and the common electrode 21 are directly in contact with each other, or a case where the refractive index of the protective layer 55 is not within the range between the refractive index of the second translucent layer 54 and the refractive index of the common electrode 21, the difference in refractive indexes at the interface is small, and therefore, it is possible to prevent the light from being reflected on the interface (the interface on the protective layer 55 side) on the translucent substrate 29 side of the common electrode 21. Therefore, it is less likely to reduce the amount of the light contributing to the display.

In addition, in the embodiment, in the manufacturing step of the lens array substrate 30, the first lens layer 51, the first translucent layer 52, the second lens layer 53, and the second translucent layer 54 are stacked in order on the mother substrate 300. At the same time, the first metal layer 56 is formed between the first lens layer 51 and the first translucent layer 52, and the first metal layer 56 remains at least at the end portion 390 of the mother substrate 300 in the first metal layer patterning step. For this reason, the first lens layer 51, the first metal layer 56, the first translucent layer 52, the second lens layer 53, and the second translucent layer 54 are stacked in order at the end portion 390 of the mother substrate 300. Here, the first metal layer 56 which is formed at the end portion 390 of the mother substrate 300 has a large Poisson's ratio compared with a film forming the first lens layer 51, the first translucent layer 52, the second lens layer 53, and the second translucent layer 54, and functions as the first buffer layer 56r which absorbs the stress. For example, the Poisson's ratio of the silicon oxide film ($SiO_x$) or the silicon oxinitride film (SiON) is equal to or less than 0.2, whereas the Poisson's ratio of the first metal layer 56 is equal to or greater than 0.3, and therefore, it is possible to absorb the stress applied to the first metal layer 56 in the thickness direction.

Particularly, in the embodiment, the stacked layer in which the first lens layer 51, the first translucent layer 52, the second lens layer 53, and the second translucent layer 54 are stacked in order is properly divided by the first metal layer 56 (the first buffer layer 56r) in the thickness direction, and thus it is possible to reduce the thickness of the translucent films stacked on the mother substrate 300 side with respect to the first metal layer 56 (the first buffer layer 56r), and on the surface opposite to the side of the mother substrate 300.

Accordingly, when forming the first translucent layer 52, the second lens layer 53, and the second translucent layer 54 formed after the first lens layer 51, even in a case where the stress is applied to the translucent film which has already been formed on the downstream side, cracks are less likely to be generated on the interface between the translucent substrate 29 and the first lens layer 51 and the interface between the first lens layer 51 and the first translucent layer 52, at the end portion 390 of the mother substrate 300. Therefore, the first lens layer 51 and the first translucent layer 52 are less likely to separate from each other.

In addition, in the embodiment, the second metal layer 57 is formed between the first translucent layer 52 and the second lens layer 53, and the second metal layer 57 which is formed at the end portion 390 of the mother substrate 300 functions as the second buffer layer 57r which absorbs the stress. Accordingly, when forming the second lens layer 53, in the second translucent layer 54 formed after the first translucent layer 52, even in a case where the stress is applied to the translucent film which is already formed on the downstream side, cracks are less likely to be generated on the interface between the translucent substrate 29 and the first lens layer 51, the interface between the first lens layer 51 and the first translucent layer 52, and the interface between the first translucent layer 52 and the second lens layer 53, at the end portion 390 of the mother substrate 300. Therefore, the first lens layer 51, the first translucent layer 52, and the second lens layer 53 are less likely to separate from form each other.

Further, in the embodiment, the third metal layer 58 is formed between the translucent substrate 29 and the first lens layer 51, and the third metal layer 58 which is formed at the end portion 390 of the mother substrate 300 functions as the third buffer layer 58r. Accordingly, at the end portion 390 of the mother substrate 300, cracks are less likely to be generated on the interface between the mother substrate 300 (the translucent substrate 29) and the first lens layer 51. Therefore, it is less likely to separate the mother substrate 300 and the first lens layer 51 from each other.

Modification Example of First Embodiment

In the first embodiment as described above, the first lens surface is formed of the first concavity 292, but the invention may be applied to a case where the first lens surface which is formed into the convex surface (the convexity) is formed on the translucent substrate. In addition, the second convexity 533 (the second lens surface) is formed on the second lens layer 53; however, the invention may be applied to a case where the concave surface (the second lens surface) is formed on the second lens layer 53, instead of the second convexity 533.

In addition, in a case where the first metal layer 56 is not provided between the first lens layer 51 and the first translucent layer 52, the first lens layer 51 and the first translucent layer 52 may be formed in succession, and in a case where the second metal layer 57 is not provided between the first translucent layer 52 and the second lens layer 53, the first translucent layer 52 and the second lens layer 53 may be formed in succession. Furthermore, in a case where the first metal layer 56 and the second metal layer 57 are not provided, the first lens layer 51, the first translucent layer 52, and the second lens layer 53 may be formed in succession. In such a case, a portion of the translucent films which are provided in succession is set as the lens layer, and the rest of the portions are set as the translucent films for adjusting the optical path length.

In the first embodiment, the first translucent layer 52 is formed of the same material as that of the first lens layer 51 and the second lens layer 53. Here, the first translucent layer 52 is formed of the same material as that of the first lens layer 51, but may be formed of different material from that of the second lens layer 53. In this case, the first translucent layer 52 has the same refractive index as that of the first lens layer 51, but has different refractive index from that of the second lens layer 53. In addition, the first translucent layer 52 is formed of the same material as that of the second lens layer 53, but may be formed of different material from that of the first lens layer 51. In this case, the first translucent layer 52 has the same refractive index as that of the second lens layer 53, but has a different refractive index from that of the first lens layer 51.

In the first embodiments, a portion of each of the first metal layer 56, the second metal layer 57, and the third metal layer 58 is used as the buffer layer (the first buffer layer 56r, the second buffer layer 57r, and the third buffer layer 58r); however, only the first metal layer 56 (the first buffer layer 56r) and the second metal layer 57 (the second buffer layer 57r) may be used as the buffer layer, or only the first metal layer 56 (the first buffer layer 56r) may be used as the buffer layer.

In addition, in the first embodiments, when forming the parting 108a, a portion of the first metal layer 56 (the parting 56a) and a portion of the second metal layer 57 (the parting 57a) are used; however, any one of the parting 56a and the parting 57a may be used. In addition, the parting 108a may be formed by using a portion of the third metal layer 58, or may be formed by using a portion of the second metal layer 57 (the parting 57a) and a portion of the third metal layer 58. In this case, the first metal layer 56 does not remain on the lens array substrate 30 acquired by being cut out from the mother substrate 300.

In the above-described embodiments, the buffer layer (the first buffer layer 56r, the second buffer layer 57r, and the third buffer layer 58r) remains at the end portion 390 of the mother substrate 300; however, the buffer layer may also remain at the end portion of the lens array substrate 30 (the end portion of the area 300s of the mother substrate 300).

Second Embodiment

Figure 11:
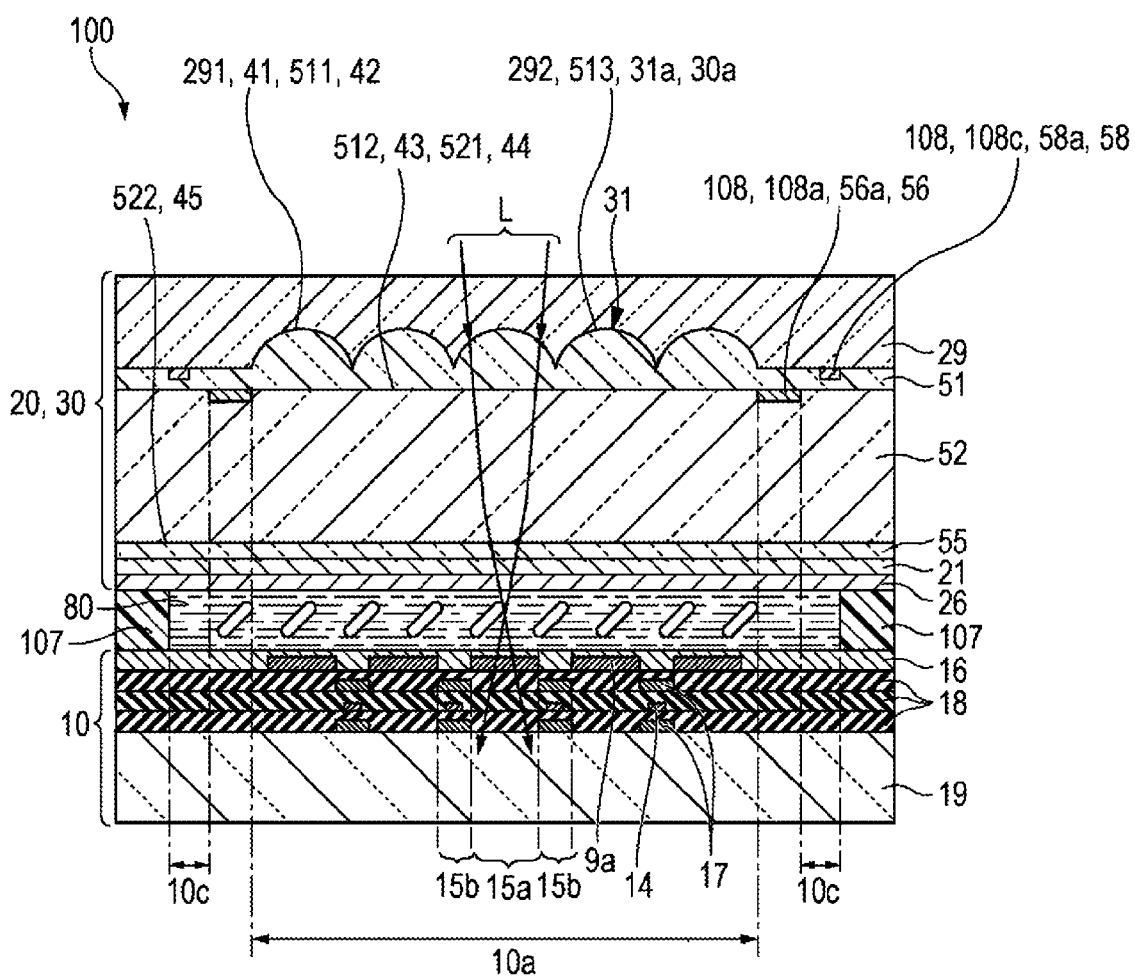
FIG. 11 is an illustrative diagram of a schematic configuration of a cross section of an electro-optical apparatus according to a second embodiment of the invention.

FIG. 11 is an illustrative diagram of a schematic configuration of a cross section of an electro-optical apparatus 100 according to a second embodiment of the invention.

As illustrated in FIG. 11, also in the electro-optical apparatus 100 of the embodiment, similar to the first embodiment, the counter substrate 20 is configured as a lens array substrate 30 on which a plurality of the lines 30a are formed in such a manner as to respectively overlap with the plurality of the pixel electrodes 9a in a plane view, and the lens array substrate 30 causes the light emitted from the light source to be converged on the opening area 15a. A single stage lens array is formed along the advancing direction of the light in the counter substrate 20 (the lens array substrate 30) of the embodiment.

Here, the lens array has the same configuration as the first lens array 31 described in the first embodiment, and thus the "concavity", the "lens layer", and the "translucent layer" which form the lens array will be respectively described as the "first concavity 292", the "first lens layer 51", and the "first translucent layer 52".

In the embodiment, when it comes to configuring the lens array substrate 30 (the counter substrate 20), the first concavity 292 (the lens surface) which is formed of the concave surface is formed on the first surface 41 which is formed of the substrate surface 291 of one of the translucent substrates 29, and on the substrate surface 291 (the first surface 41) of one of the translucent substrates 29, the first translucent lens layer 51, the first translucent layer 52, and the translucent protective layer 55, which are described later, are stacked in order.

In the embodiment, similar to the first embodiment, the first lens layer 51 is provided with a surface 511 (a second surface 42) which covers the substrate surface 291 (the first surface 41) of the translucent substrate 29, and a flat surface 512 (a third surface 43) which is positioned on the side opposite to the surface 511 (the second surface 42). In addition, the surface 511 of the first lens layer 51 (the second surface 42) includes a first hemispherical convexity 513 with which the first concavity 292 of the translucent substrate 29 is filled. Here, the translucent substrate 29 and the first lens layer 51 have different refractive indexes from each other, and the first concavity 292 and the first convexity 513 configure a lens 31a (the lens 30a) of the first lens array 31. In the embodiment, the refractive index of the first lens layer 51 is greater than the refractive index of the translucent substrate 29. For example, the translucent substrate 29 is formed of a quartz substrate (a silicon oxide film and $SiO_2$) and the refractive index thereof is 1.48, whereas the first lens layer 51 is formed of the silicon oxinitride film (SiON) and the refractive index thereof is 1.58 to 1.68. Therefore, the lens 31a includes power causing the light emitted from the light source to be converged.

The first translucent layer 52 covers the first lens layer 51 on the side opposite to the translucent substrate 29, and is provided with a surface 521 (a fourth surface 44) which covers the flat surface 512 of the first lens layer 51 (a third surface 43), and a surface 522 (a fifth surface 45) which is positioned on the side opposite to the surface 521 (the fourth surface 44). In the embodiment, similar to the first embodiment, the first translucent layer 52 has the same refractive index as that of the first lens layer 51. More specifically, the first translucent layer 52 is formed of silicon oxinitride film (SiON) similar to the first lens layer 51. However, the nitrogen content of the first translucent layer 52 is slightly different from that of the first lens layer 51, and the refractive index thereof is 1.58 to 1.64. The first translucent layer 52 is a first optical path length adjusting layer which adjusts an optical path length between the first lens array 31 and the second lens array 32.

In the embodiment, the translucent protective layer 55 is formed on the flat surface 522 (the fifth surface 45) of the first translucent layer 52, and with respect to the protective layer 55, and the translucent common electrode 21 (a translucent electrode) is formed on the side opposite to the first translucent layer 52 or the translucent substrate 29. In addition, with respect to the common electrode 21, the oriented film 26 is formed on the side opposite to the protective layer 55 or the translucent substrate 29.

Here, the refractive index of the protective layer 55 is within a range between the refractive index of the first translucent layer 52 and the refractive index of the translucent electrode. More specifically, the first translucent layer 52 is formed of the silicon oxinitride film (having the refractive index range of 1.58 to 1.64), the protective layer 55 is formed of the aluminum oxide film (having the refractive index range of 1.67), and the common electrode 21 (having the translucent electrode) is formed of the ITO film (having the refractive index of 1.91).

In addition, the first metal layer 56 and the third metal layer 58 are formed between the above-described translucent films on the lens array substrate 30 of the embodiment. Specifically, on the lens array substrate 30, as the frame shaped parting 108a extending along the outer periphery of the display area 10a, a parting 56a which is formed of the first metal layer 56 is formed between the flat surface 512 of the first lens layer 51 (the third surface 43) and the surface 52 of the first translucent layer 521 (the fourth surface 44). In addition, a shielding layer which is formed of the first metal layer 56 (not shown) is formed in the display area 10a, as the light shielding layer 108b illustrated in FIG. 1B and FIG. 3.

Further, in the mark forming area 10c, as the alignment mark 108c, the alignment mark 58c which is formed of the third metal layer 58 is formed between the substrate surface 291 (the first surface 41) of the translucent substrate 29 and the surface 511 of the first lens layer 51 (the second surface 42), and the alignment mark 58c is used for the positioning at the time of forming the first concavity 292 on the substrate surface 291 (the first surface 41) of the translucent substrate 29.

When it comes to manufacturing the lens array substrate 30, the following steps, among the steps described by referring to FIG. 5A to FIG. 10B, are performed in order.

Third metal layer forming step
Third metal layer patterning step
Concavity forming step
First lens layer forming step
First flattening step
First metal layer forming step
First metal layer patterning step
First translucent layer forming step
First flattening step As described above, in the embodiment, the first translucent layer 52 (the optical path length adjusting layer) is provided on the side opposite to the translucent substrate 29 of the first lens layer 51, the second translucent layer 54 (the optical path length adjusting layer) is provided on the side opposite to the translucent substrate 29 of the second lens layer 53, and thus it is possible to properly control the position in which the light emitted from the lenses 31a and 32a is converged.

In addition, the first translucent layer 52 is formed of the same material as that of the first lens layer 51, and thus has the same refractive index as that of the first lens layer 51. For this reason, it is possible to prevent the light from being reflected on the interface between the first translucent layer 52 and the first lens layer 51. Therefore, it is less likely to reduce the amount of the light contributing to the display.

In addition, the first translucent layer 52 is formed of the silicon oxinitride film (having the refractive index range of 1.58 to 1.64), the protective layer 55 is formed of the aluminum oxide film (having the refractive index range of 1.67), and the common electrode 21 (having the translucent electrode) is formed of the ITO film (having the refractive index range of 1.91). Further, the refractive index of the protective layer 55 is within a range between the refractive index of the first translucent layer 52 and the refractive index of the common electrode 21. Accordingly, in comparison with a case where the first translucent layer 52 and the common electrode 21 are directly in contact with each other, or a case where the refractive index of the protective layer 55 is not within the range between the refractive index of the first translucent layer 52 and the refractive index of the common electrode 21, the difference in refractive indexes at the interface is small, and therefore, it is possible to prevent the light from being reflected on the interface (the interface on the protective layer 55 side) on the translucent substrate 29 side of the common electrode 21. Therefore, it is less likely to reduce the amount of the light contributing to the display.

Modification of Second Embodiment

In the second embodiment as described above, the lens surface is formed of the first concavity 292, but the invention may be applied to a case where the convexity (the lens surface) which is formed into the convex surface is formed on the translucent substrate.

In the second embodiment as described above, when it comes to forming the parting 108a, a portion of the first metal layer 56 (the parting 56a) was used, but the parting 108a may be formed by using only a portion of the third metal layer 58.

Application Examples of Other Electro-Optical Apparatuses

In the above-described embodiments, the liquid crystal device was described as an example of the electro-optical apparatus; however, the invention is not limited thereto, and may be applied to an electro optical module using an organic electroluminescent display panel, a plasma display panel, a field emission display (FED) panel, a surface-conduction electron-emitter display (SED) panel, a light emitting diode (LED) display panel, an electrophoresis display panel, or the like.

Example of being Mounted on Electronic Equipment

Figure 12:
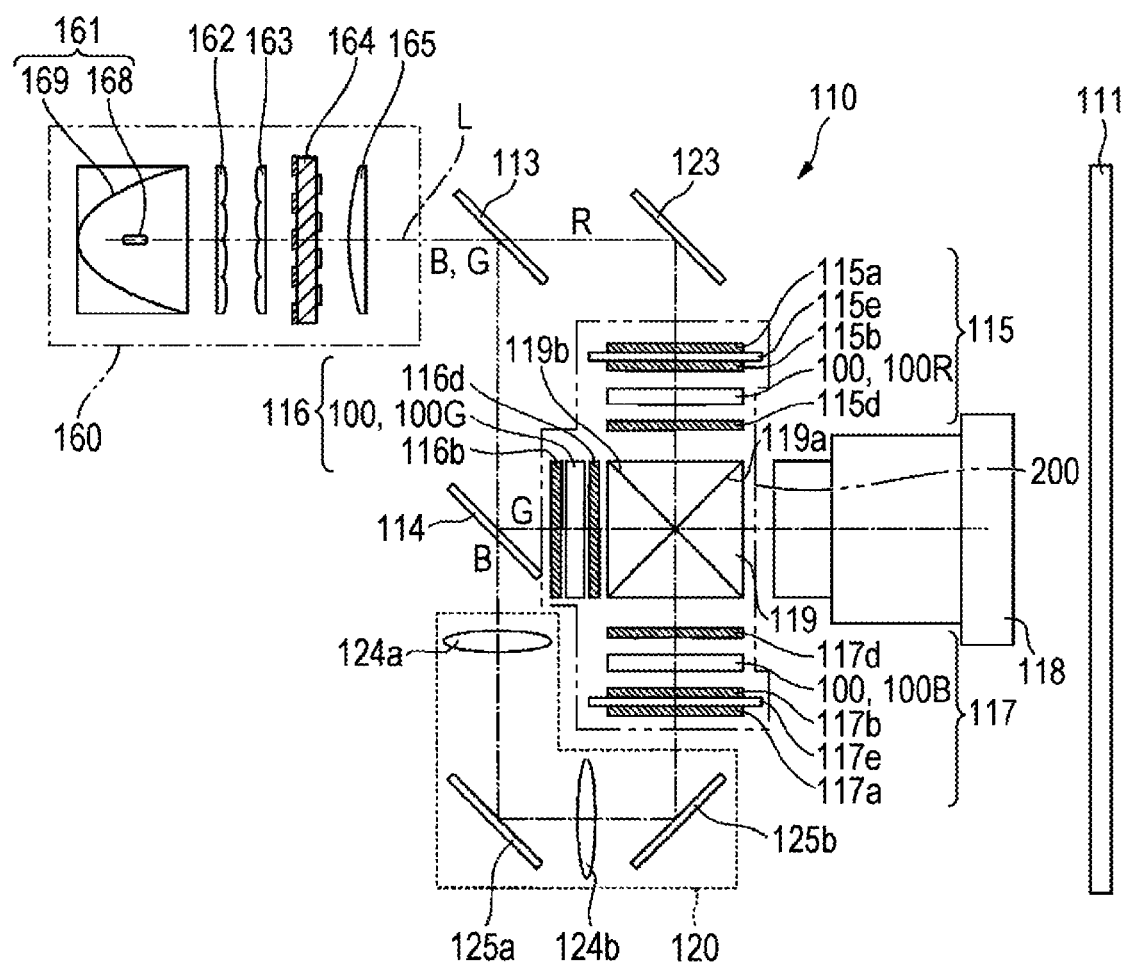
FIG. 12 is a schematic configuration diagram of a projection type display device (electronic equipment) using the electro-optical apparatus according to the first embodiment of the invention.

FIG. 12 is a schematic configuration diagram of a projection type display device (electronic equipment) using the electro-optical apparatus 100 to which the invention is applied. Note that, in the following description, a plurality of electro-optical apparatuses 100 to which light beams having different wavelengths from each other are supplied are used, and the electro-optical apparatus 100 to which the invention is applied is used in all of the plurality of electro-optical apparatuses 100.

The projection type display device 110 as illustrated in FIG. 12 is a liquid crystal projector using a transmission type electro-optical apparatus 100, and a member to be projected 111 is irradiated with light so as to display an image. The projection type display device 110 includes, along an optical axis L, a lighting system 160, the plurality of electro-optical apparatuses 100 (liquid crystal light valves 115 to 117) to which light beams emitted from the lighting system 160 are supplied, a cross dichroic prism 119 (a light combination optical system) which combines and emits the light beams emitted from the plurality of electro-optical apparatuses 100, and a projection optical system 118 which projects the light beams combined by the cross dichroic prism 119. In addition, the projection type display device 110 is provided with dichroic mirrors 113 and 114, and a relay system 120. In the projection type display device 110, the electro-optical apparatus 100 and the cross dichroic prism 119 form an optical unit 200.

In the lighting system 160, along the optical axis L, a light source unit 161, a first integrator lens 162 which is formed of the lens array such as a fly-eye lens, or the like, and a second integrator lens 163 which is formed of the lens array such as the fly-eye lens, or the like, a polarized light conversion element 164, and a condenser lens 165 are disposed in order. The light source unit 161 is provided with a light source 168 which emits white light including red light R, green light G, and blue light B, and a reflector 169. The light source 168 is formed of an extra-high pressure mercury lamp or the like, and the reflector 169 includes a parabolic cross section. The first integrator lens 162 and the second integrator lens 163 uniformize illuminance distribution of the light which is emitted from the light source unit 161. The polarized light conversion element 164 converts the light emitted from the light source unit 161 into the polarized light having a specific vibration direction, for example, as s-polarized light.

The red light R which is included in the light emitted from the lighting system 160 is transmitted through the dichroic mirror 113 while the green light G and the blue light B are reflected on the dichroic mirror 113. Among the green light G and the blue light B which are reflected on the dichroic mirror 113, the blue light B is transmitted through the dichroic mirror 114 while the green light G is reflected on the dichroic mirror 114. As described above, the dichroic mirrors 113 and 114 form a color separation optical system which separates the light emitted from the lighting system 160 into the red light R, the green light G, and the blue light B.

The liquid crystal light valve 115 is a transmission type liquid crystal device which modulates the red light R which is transmitted through the dichroic mirror 113 and is reflected on the reflection mirror 123 in accordance with an image signal. The liquid crystal light valve 115 is provided with a λ/2 phase difference plate 115a, a first polarized light plate 115b, the electro-optical apparatus 100 (an electro-optical apparatus for red 100R), and a second light shielding plate 115d. Here, even in a case where the red light R which is incident on the liquid crystal light valve 115 is transmitted through the dichroic mirror 113, the polarized light thereof is not changed, and thus the s-polarized light remains as it was.

The λ/2 phase difference plate 115a is an optical element which converts the s-polarized light incident on the liquid crystal light valve 115 into p-polarized light. The first polarized light plate 115b is a polarized light plate through which the p-polarized light is transmitted by shielding the s-polarized light. The electro-optical apparatus 100 (the electro-optical apparatus for red 100R) is configured to convert the p-polarized light into the s-polarized light through the modulation in accordance with the image signal (circular polarization of light or elliptic polarization of light in the case of intermediate gradation). The second light shielding plate 115d is a polarized light plate through which the s-polarized light is transmitted by shielding the p-polarized light. Accordingly, the liquid crystal light valve 115 modulates the red light R in accordance with the image signal, and emits the modulated red light R to the cross dichroic prism 119. The λ/2 phase difference plate 115a and the first polarized light plate 115b are disposed in a state of being connected to a translucent glass plate 115e which does not perform the conversion of the polarized light, and thus it is possible to prevent the λ/2 phase difference plate 115a and the first polarized light plate 115b from being strained due to heat generation.

The liquid crystal light valve 116 is a transmission type liquid crystal device which modulates the green light G which is reflected on the dichroic mirror 114 after being reflected on the dichroic mirror 113 in accordance with the image signal. Similar to the liquid crystal light valve 115, the liquid crystal light valve 116 is provided with a first polarized light plate 116b, the electro-optical apparatus 100 (a electro-optical apparatus for green 100G), and a second light shielding plate 116d. The green light G which is incident on the liquid crystal light valve 116 is the s-polarized light which is reflected and incident on the dichroic mirrors 113 and 114. The first polarized light plate 116b is a polarized light plate through which the s-polarized light is transmitted by shielding the p-polarized light. The electro-optical apparatus 100 (the electro-optical apparatus for green 100G) is configured to convert the s-polarized light into the p-polarized light through the modulation in accordance with the image signal (circular polarization of light or elliptic polarization of light in the case of intermediate gradation). The second light shielding plate 116d is a polarized light plate through which the p-polarized light is transmitted by shielding the s-polarized light. Accordingly, the liquid crystal light valve 116 modulates the green light G in accordance with the image signal, and emits the modulated green light G to the cross dichroic prism 119.

The liquid crystal light valve 117 is a transmission type liquid crystal device which modulates the blue light B which passes through the relay system 120 after being reflected on the dichroic mirror 113 and transmitted through the dichroic mirror 114 in accordance with the image signal. Similar to the liquid crystal light valves 115 and 116, the liquid crystal light valve 117 is provided with a λ/2 phase difference plate 117a, a first polarized light plate 117b, the electro-optical apparatus 100 (an electro-optical apparatus 100B for blue), and a second light shielding plate 117d. The blue light B which is incident on the liquid crystal light valve 117 is considered to be the s-polarized light because the blue light B is reflected on the dichroic mirror 113 and transmitted through the dichroic mirror 114, and then reflected on two reflection mirrors of 125a and 125b in the relay system 120.

The λ/2 phase difference plate 117a is an optical element which converts the s-polarized light incident on the liquid crystal light valve 117 into p-polarized light. The first polarized light plate 117b is a polarized light plate through which the p-polarized light is transmitted by shielding the s-polarized light. The electro-optical apparatus 100 (the electro-optical apparatus for blue 100B) is configured to convert the p-polarized light into the s-polarized light through the modulation in accordance with the image signal (circular polarization of light or elliptic polarization of light in the case of intermediate gradation). The second light shielding plate 117d is a polarized light plate through which the s-polarized light is transmitted by shielding the p-polarized light. Accordingly, the liquid crystal light valve 117 modulates the blue light B in accordance with the image signal, and emits the modulated blue light B to the cross dichroic prism 119. In addition, the λ/2 phase difference plate 117a and the first polarized light plate 117b are disposed in a state of being connected to a glass plate 117e.

The relay system 120 is provided with relay lenses 124a and 124b, and the reflection mirrors 125a and 125b. The relay lenses 124a and 124b are provided to prevent optical loss caused by the long optical path of the blue light B. The relay lens 124a is disposed between the dichroic mirror 114 and the reflection mirror 125a. The relay lens 124b is disposed between the reflection mirrors 125a and 125b. The blue light B emitted from the relay lens 124a is transmitted through the dichroic mirror 114 and then is reflected on the reflection mirror 125a toward the relay lens 124b. The blue light B which is emitted from the relay lens 124b is reflected on the reflection mirror 125b toward the liquid crystal light valve 117.

The cross dichroic prism 119 is a color synthesis optical system in which two dichroic films 119a and 119b are disposed to meet at an angle. The dichroic film 119a is a film on which the blue light B is reflected and through which the green light G is transmitted, and the dichroic film 119b is a film on which the red light R is reflected and through which the green light G is transmitted. Accordingly, the cross dichroic prism 119 combines the red light R, the green light G, and the blue light B which are respectively modulated by the liquid crystal light valves 115 to 117, so as to emit the light toward the projection optical system 118.

Meanwhile, the light incident on the cross dichroic prism 119 from the liquid crystal light valves 115 and 117 is the s-polarized light, and the light incident on the cross dichroic prism 119 from the liquid crystal light valve 116 is the p-polarized light. As described above, when the light beams incident on the cross dichroic prism 119 are set to be different types of polarized light, it is possible to combine the light emitted from each of the liquid crystal light valves 115 to 117 in the cross dichroic prism 119. Here, typically, the dichroic films 119a and 119b are excellent in reflectivity of the s-polarized light. For this reason, the red light R and the blue light B which are reflected on the dichroic films 119a and 119b are set as the s-polarized light, and the green light G which is transmitted through the dichroic films 119a and 119b is set as the p-polarized light. The projection optical system 118 includes a projection lens (not shown), and the light which is combined by the cross dichroic prism 119 is projected to the member to be projected 111 to the screen or the like.

Other Projection Type Display Devices

In the above-described projection type display device, the transmission type electro-optical apparatus 100 is used; however, the projection type display device may be configured by using a reflection type electro-optical apparatus 100. In addition, in the projection type display device, an LED light source emitting each color light may use as a light source unit, and the color light emitted from the LED light source may be supplied to each liquid crystal device.

Other Types of Electronic Equipment

Examples of the electro-optical apparatus 100 to which the invention is applied can be used as a direct viewing type display device in the electronic equipment such as a mobile phone, a personal digital assistant (PDA), a digital camera, a liquid crystal television, a car navigation device, a video phone, a POS terminal, a device including a touch panel, or the like, in addition to the above-described electronic equipment.

The entire disclosure of Japanese Patent Application No. 2014-145665, filed Jul. 16, 2014 is expressly incorporated by reference herein.

What is claimed is:

1. A lens array substrate comprising:
  a substrate that has a first lens surface, the first lens surface includes a concave surface or a convex surface formed on one surface thereof;
  a first lens layer that covers one surface of the substrate, the first lens layer is translucent and has a refractive index different from that of the substrate;
  a first translucent layer that covers the first lens layer on a side opposite to the substrate;
  a second lens layer that covers the first translucent layer on the side opposite to the substrate, and on which a second lens surface is formed which is formed of a concave surface or a convex surface on a surface of the second lens layer on the side opposite to the substrate; and
  a second translucent layer that covers the second lens layer on the side opposite to the substrate,
  wherein the first translucent layer is formed so as to have the same refractive index as that of at least one of the first lens layer and the second lens layer.

2. The lens array substrate according to claim 1,
  wherein the first translucent layer includes the same material as that of at least one of the first lens layer and the second lens layer.

3. An electro-optical apparatus including a lens array substrate according to claim 2, comprising:
  an element substrate that faces the lens array substrate on one surface side of the substrate; and
  an electro-optical layer that is disposed between the element substrate and the lens array substrate.

4. The lens array substrate according to claim 1,
  wherein the first translucent layer is formed so as to have the same refractive index as that of both of the first lens layer and the second lens layer.

5. The lens array substrate according to claim 4,
  wherein the first translucent layer includes the same material as that of both of the first lens layer and the second lens layer.

6. An electro-optical apparatus including a lens array substrate according to claim 5, comprising:
  an element substrate that faces the lens array substrate on one surface side of the substrate; and
  an electro-optical layer that is disposed between the element substrate and the lens array substrate.

7. An electro-optical apparatus including a lens array substrate according to claim 4, comprising:
  an element substrate that faces the lens array substrate on one surface side of the substrate; and
  an electro-optical layer that is disposed between the element substrate and the lens array substrate.

8. The lens array substrate according to claim 1, further comprising:
  a translucent protective layer that covers the second translucent layer on the side opposite to the substrate; and
  an electrode that is formed on a surface of the translucent protective layer on the side opposite to the substrate, the electrode being translucent,
  wherein a refractive index of the translucent protective layer is a refractive index within a range between a refractive index of the second translucent layer and a refractive index of the electrode.

9. The lens array substrate according to claim 8,
  wherein the second translucent layer includes a silicon oxide film,
  wherein the translucent protective layer includes an aluminum oxide film, and
  wherein the electrode includes an ITO film.

10. An electro-optical apparatus including a lens array substrate according to claim 9, comprising:
  an element substrate that faces the lens array substrate on one surface side of the substrate; and
  an electro-optical layer that is disposed between the element substrate and the lens array substrate.

11. An electro-optical apparatus including a lens array substrate according to claim 8, comprising:
  an element substrate that faces the lens array substrate on one surface side of the substrate; and
  an electro-optical layer that is disposed between the element substrate and the lens array substrate.

12. An electro-optical apparatus including a lens array substrate according to claim 1, comprising:
  an element substrate that faces the lens array substrate on one surface side of the substrate; and
  an electro-optical layer that is disposed between the element substrate and the lens array substrate.

13. Electronic equipment comprising the electro-optical apparatus according to claim 12.

14. A lens array substrate comprising:
  a substrate that has a lens surface, the lens surface includes a concave surface or a convex surface formed on one surface thereof;
  a lens layer that covers one surface of the substrate, the lens layer is translucent and has a refractive index different from that of the substrate;
  a translucent layer that covers the lens layer on a side opposite to the substrate;
  a translucent protective layer that covers the translucent layer on the side opposite to the substrate; and
  an electrode that is formed on a surface of the translucent protective layer that is on the side opposite to the substrate, the electrode being translucent,
  wherein a refractive index of the translucent protective layer is a refractive index within a range between a refractive index of the translucent layer and a refractive index of the electrode, and
  wherein the translucent layer has the same refractive index as that of the lens layer.

15. The lens array substrate according to claim 14,
wherein the translucent layer includes the same material as that of the lens layer.

16. An electro-optical apparatus including a lens array substrate according to claim 15, comprising:
an element substrate that faces the lens array substrate on one surface side of the substrate; and
an electro-optical layer that is disposed between the element substrate and the lens array substrate.

17. The lens array substrate according to claim 14,
wherein the translucent layer includes a silicon oxinitride film,
wherein the translucent protective layer includes an aluminum oxide film, and
wherein the translucent electrode includes an ITO film.

18. An electro-optical apparatus including a lens array substrate according to claim 14, comprising:
an element substrate that faces the lens array substrate on one surface side of the substrate; and
an electro-optical layer that is disposed between the element substrate and the lens array substrate.

* * * * *